US011240863B2

(12) United States Patent
Venugopal et al.

(10) Patent No.: US 11,240,863 B2
(45) Date of Patent: Feb. 1, 2022

(54) AUTONOMOUS TRANSMISSION CONFIGURATION UPDATING

(71) Applicant: QUALCOMM Incorporated, San Diego, CA (US)

(72) Inventors: Kiran Venugopal, Raritan, NJ (US); Jung Ho Ryu, Fort Lee, NJ (US); Tianyang Bai, Bridgewater, NJ (US); Makesh Pravin John Wilson, San Diego, CA (US); Tao Luo, San Diego, CA (US); Yan Zhou, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 31 days.

(21) Appl. No.: 16/735,378

(22) Filed: Jan. 6, 2020

(65) Prior Publication Data

US 2020/0229257 A1 Jul. 16, 2020

Related U.S. Application Data

(60) Provisional application No. 62/791,648, filed on Jan. 11, 2019.

(51) Int. Cl.
H04W 76/18 (2018.01)
H04W 76/15 (2018.01)
(Continued)

(52) U.S. Cl.
CPC ........... *H04W 76/18* (2018.02); *H04W 24/08* (2013.01); *H04W 72/042* (2013.01);
(Continued)

(58) Field of Classification Search
CPC ..... H04W 76/18; H04W 76/15; H04W 24/08; H04W 72/1268; H04W 72/042; H04W 72/046; H04W 72/14
See application file for complete search history.

(56) References Cited

U.S. PATENT DOCUMENTS

2015/0009841 A1 1/2015 Lee et al.
2019/0098520 A1* 3/2019 Kim ...................... H04W 76/28
(Continued)

FOREIGN PATENT DOCUMENTS

WO WO-2020018178 A1 1/2020

OTHER PUBLICATIONS

Huawei, et al., "Beam Failure Recovery for Scell", 3GPP Draft, R1-1813561, 3GPP TSG RAN WG1 Meeting #95, 3rd Generation Partnership Project (3GPP), Mobile Competence Centre, 650, Route Des Lucioles, F-06921 Sophia-Antipolis Cedex, France, vol. RAN WG1, No. Spokane, USA, Nov. 12, 2018-Nov. 16, 2018, Nov. 3, 2018 (Nov. 3, 2018), XP051479899, 7 Pages, Retrieved from the Internet:—URL: http://www.3gpp.org/ftp/tsg%5Fran/WG1%5FRL1/ TSGR1%5F95/Docs/R1%2D1813561%2Ezip, [retrieved on Nov. 3, 2018], 2.1 Scenario for beam failure recovery for SCell, figure 4 2.2.2, New candidate beam identification, 2.2.3 Beam failure recovery (BFRQ).

(Continued)

Primary Examiner — Wei Zhao
(74) Attorney, Agent, or Firm — Danai Nelisile Mhembere; Holland & Hart LLP

(57) ABSTRACT

Methods, systems, and devices for wireless communications are described that allow secondary cell (SCell) beam failure recovery using a primary cell (PCell). A user equipment (UE) may transmit, via the PCell, an indication of a beam failure of the SCell in a scheduling request (SR) or in a dedicated SR message. After receiving the indication, the base station may request a report from the UE or alternatively, may monitor a set of resources for a report without transmitting a request to the UE. The report may be transmitted via the PCell and may include an indication of a selected beam to use for subsequent communications on the SCell. Based on the report, the base station may modify its transmission configuration for the SCell and communicate with the UE via the selected beam.

30 Claims, 20 Drawing Sheets

(51) Int. Cl.
*H04W 72/12* (2009.01)
*H04W 24/08* (2009.01)
*H04W 72/04* (2009.01)
*H04W 72/14* (2009.01)

(52) U.S. Cl.
CPC ..... *H04W 72/046* (2013.01); *H04W 72/1268* (2013.01); *H04W 72/14* (2013.01); *H04W 76/15* (2018.02)

(56) References Cited

U.S. PATENT DOCUMENTS

2019/0132778 A1   5/2019   Park et al.
2020/0196343 A1*  6/2020   Marinier .............. H04L 1/1854
2020/0220608 A1   7/2020   Venugopal et al.
2020/0336954 A1* 10/2020   Park .................... H04W 24/10

OTHER PUBLICATIONS

International Search Report and Written Opinion—PCT/US2020/012604—ISA/EPO—dated Apr. 14, 2020.
NEC: "Discussion on Beam Failure Recovery", 3GPP Draft, R1-1812646 Discussion on Beam Failure Recovery, 3rd Generation Partnership Project (3GPP), Mobile Competence Centre, 650, Route Des Lucioles, F-06921 Sophia-Antipolis Cedex, France, vol. RAN WG1, No. Spokane, US, Nov. 12, 2018-Nov. 16, 2018, Nov. 11, 2018 (Nov. 11, 2018), XP051554602, 2 pages, Retrieved from the Internet: URL: http://www.3gpp.org/ftp/Meetings%5F3GPP%5FSYNC/RAN1/Docs/R1%2D1812646%2Ezip. [retrieved on Nov. 11, 2018] Sections 2-3.

* cited by examiner

AUTONOMOUS TRANSMISSION CONFIGURATION UPDATING

CROSS REFERENCE

The present Application for Patent claims the benefit of U.S. Provisional Patent Application No. 62/791,648 by Venugopal et al. entitled "AUTONOMOUS TRANSMISSION CONFIGURATION UPDATING," filed Jan. 11, 2019, assigned to the assignee hereof, and expressly incorporated by reference in its entirety herein.

BACKGROUND

The following relates generally to wireless communications, and more specifically to autonomous transmission configuration updating.

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include a number of base stations or network access nodes, each simultaneously supporting communication for multiple communication devices, which may be otherwise known as user equipment (UE).

In some systems, a UE may communicate with a base station (or multiple base stations) via a primary cell (PCell) and a secondary cell (SCell). When utilizing beamforming, different beams may be used for communication via the PCell or the SCell. If the quality of a current beam used for SCell communications degrades, a beam recovery procedure may be initiated. In some cases, however, the initiated beam recovery procedure may result in increased system latency or may be unsuccessful.

SUMMARY

The described techniques relate to improved methods, systems, devices, and apparatuses that support autonomous transmission configuration updating and may provide for more efficient secondary cell (SCell) beam failure recovery using the primary cell (PCell). For example, if the current downlink beam used for communications via the SCell degrades or fails, a user equipment (UE) may transmit an indication of the degradation or failure via the PCell (e.g., in a scheduling request (SR) via a physical uplink control channel (PUCCH), or in a dedicated SR message configured for indications of beam failure). After receiving the indication, the base station may request an uplink report from the UE or alternatively, may monitor a set of resources for the uplink report without transmitting a request to the UE.

The report may be transmitted via the PCell and may include an indication of a downlink beam to use for subsequent communications on the SCell. For example, the UE may select a candidate beam that is preferred over the current beam (e.g., based on a measurement parameter such as reference signal received power (RSRP), signal to interference plus noise ratio (SINR), or other parameter), and include the selected beam in the report to the base station. The base station may modify its transmission configuration indicator (TCI) state for the SCell and communicate with the UE via the selected beam. After the downlink beam for SCell communications is recovered, the uplink beam for transmission from the UE to the base station via the SCell may be recovered (e.g., after a set number of symbols following recovery of the downlink beam).

A method of wireless communications at a UE is described. The method may include establishing a first communication link and a second communication link with a base station, detecting a beam failure of a first beam associated with the second communication link, transmitting, to the base station via the first communication link, an indication of the beam failure of the first beam associated with the second communication link, transmitting, to the base station via the first communication link, a report indicating a second beam for communicating via the second communication link, and communicating with the base station via the second communication link using the second beam.

An apparatus for wireless communications at a UE is described. The apparatus may include a processor, memory coupled with the processor, and instructions stored in the memory. The instructions may be executable by the processor to cause the apparatus to establish a first communication link and a second communication link with a base station, detect a beam failure of a first beam associated with the second communication link, transmit, to the base station via the first communication link, an indication of the beam failure of the first beam associated with the second communication link, transmit, to the base station via the first communication link, a report indicating a second beam for communicating via the second communication link, and communicate with the base station via the second communication link using the second beam.

Another apparatus for wireless communications at a UE is described. The apparatus may include means for establishing a first communication link and a second communication link with a base station, detecting a beam failure of a first beam associated with the second communication link, transmitting, to the base station via the first communication link, an indication of the beam failure of the first beam associated with the second communication link, transmitting, to the base station via the first communication link, a report indicating a second beam for communicating via the second communication link, and communicating with the base station via the second communication link using the second beam.

A non-transitory computer-readable medium storing code for wireless communications at a UE is described. The code may include instructions executable by a processor to establish a first communication link and a second communication link with a base station, detect a beam failure of a first beam associated with the second communication link, transmit, to the base station via the first communication link, an indication of the beam failure of the first beam associated with the second communication link, transmit, to the base station via the first communication link, a report indicating a second beam for communicating via the second communication link, and communicate with the base station via the second communication link using the second beam.

Some examples of the method, apparatuses, and non-transitory computer-readable medium described herein may further include operations, features, means, or instructions for transmitting the indication of the beam failure of the first beam in a dedicated SR message via the first communication link, the dedicated SR message configured for indications of beam failures.

Some examples of the method, apparatuses, and non-transitory computer-readable medium described herein may further include operations, features, means, or instructions for transmitting the report via the PUCCH after transmission of the indication of the beam failure.

Some examples of the method, apparatuses, and non-transitory computer-readable medium described herein may further include operations, features, means, or instructions for transmitting the indication of the beam failure of the first beam in a SR message via a PUCCH.

Some examples of the method, apparatuses, and non-transitory computer-readable medium described herein may further include operations, features, means, or instructions for receiving a grant for uplink shared channel resources from the base station in response to the SR message, and transmitting the report using the uplink shared channel resources indicated by the grant.

Some examples of the method, apparatuses, and non-transitory computer-readable medium described herein may further include operations, features, means, or instructions for monitoring for a response from the base station based on the SR message, and transmitting one or more additional SR messages based on an absence of a response to the SR message from the base station, the one or more additional SR messages transmitted according to an SR count limit or a time duration associated with SR messages.

Some examples of the method, apparatuses, and non-transitory computer-readable medium described herein may further include operations, features, means, or instructions for transmitting the report via the PUCCH after transmission of the indication of the beam failure.

Some examples of the method, apparatuses, and non-transitory computer-readable medium described herein may further include operations, features, means, or instructions for transmitting the report after expiration of a time duration following transmission of the indication of the beam failure, the time duration associated with a number of symbols or a fixed time interval.

In some examples of the method, apparatuses, and non-transitory computer-readable medium described herein, the report may be transmitted in an absence of receiving a request for the report.

Some examples of the method, apparatuses, and non-transitory computer-readable medium described herein may further include operations, features, means, or instructions for receiving, from the base station, a request for the report via a downlink control channel, and transmitting the report in response to the request.

Some examples of the method, apparatuses, and non-transitory computer-readable medium described herein may further include operations, features, means, or instructions for receiving the request via a physical downlink control channel (PDCCH) or a dedicated PDCCH, where the request includes a grant for uplink shared channel resources for the UE, and transmitting the report via the uplink shared channel resources for the UE indicated by the grant.

Some examples of the method, apparatuses, and non-transitory computer-readable medium described herein may further include operations, features, means, or instructions for transmitting the indication of the beam failure of the first beam in a dedicated SR message, receiving the request for the report from the base station in response to the dedicated SR message, and transmitting the report via a PUCCH in response to the request.

Some examples of the method, apparatuses, and non-transitory computer-readable medium described herein may further include operations, features, means, or instructions for receiving the request within a time window after transmission of the indication of the beam failure.

In some examples of the method, apparatuses, and non-transitory computer-readable medium described herein, the request may be associated with a downlink control information (DCI) format for the downlink control channel.

Some examples of the method, apparatuses, and non-transitory computer-readable medium described herein may further include operations, features, means, or instructions for monitoring a downlink reference signal from the base station via the second communication link using the first beam, and measuring a parameter of the downlink reference signal based on the monitoring, where beam failure of the first beam may be detected based on determining that the measured parameter crosses a threshold.

Some examples of the method, apparatuses, and non-transitory computer-readable medium described herein may further include operations, features, means, or instructions for monitoring a downlink reference signal from the base station via the second communication link using the second beam of a set of beams, and determining that the second beam may be preferred over the first beam for communicating via the second communication link based on the monitoring.

Some examples of the method, apparatuses, and non-transitory computer-readable medium described herein may further include operations, features, means, or instructions for updating a downlink beam for the second communication link according to the second beam.

Some examples of the method, apparatuses, and non-transitory computer-readable medium described herein may further include operations, features, means, or instructions for updating an uplink beam for the second communication link for the UE after expiration of a time interval following the update of the downlink beam.

In some examples of the method, apparatuses, and non-transitory computer-readable medium described herein, the uplink beam may be associated with at least one of a physical uplink shared channel (PUSCH) or a PUCCH.

In some examples of the method, apparatuses, and non-transitory computer-readable medium described herein, the uplink beam may be updated based on antenna weights associated with the updated downlink beam.

A method of wireless communications at a base station is described. The method may include establishing a first communication link and a second communication link with a UE, receiving, from the UE via the first communication link, an indication of a beam failure of a first beam associated with the second communication link, receiving, from the UE via the first communication link, a report indicating a second beam for communicating with the UE via the second communication link, and communicating with the UE via the second communication link using the second beam.

An apparatus for wireless communications at a base station is described. The apparatus may include a processor, memory coupled with the processor, and instructions stored in the memory. The instructions may be executable by the processor to cause the apparatus to establish a first communication link and a second communication link with a UE, receive, from the UE via the first communication link, an indication of a beam failure of a first beam associated with the second communication link, receive, from the UE via the first communication link, a report indicating a second beam for communicating with the UE via the second communication link, and communicate with the UE via the second communication link using the second beam.

Another apparatus for wireless communications at a base station is described. The apparatus may include means for establishing a first communication link and a second communication link with a UE, receiving, from the UE via the first communication link, an indication of a beam failure of a first beam associated with the second communication link, receiving, from the UE via the first communication link, a report indicating a second beam for communicating with the UE via the second communication link, and communicating with the UE via the second communication link using the second beam.

A non-transitory computer-readable medium storing code for wireless communications at a base station is described. The code may include instructions executable by a processor to establish a first communication link and a second communication link with a UE, receive, from the UE via the first communication link, an indication of a beam failure of a first beam associated with the second communication link, receive, from the UE via the first communication link, a report indicating a second beam for communicating with the UE via the second communication link, and communicate with the UE via the second communication link using the second beam.

Some examples of the method, apparatuses, and non-transitory computer-readable medium described herein may further include operations, features, means, or instructions for receiving the indication of the beam failure of the first beam in a dedicated SR message via the first communication link, the dedicated SR message configured for indications of beam failures.

Some examples of the method, apparatuses, and non-transitory computer-readable medium described herein may further include operations, features, means, or instructions for receiving the report via the PUCCH after transmission of the indication of the beam failure.

Some examples of the method, apparatuses, and non-transitory computer-readable medium described herein may further include operations, features, means, or instructions for receiving the indication of the beam failure of the first beam in a SR message via a PUCCH.

Some examples of the method, apparatuses, and non-transitory computer-readable medium described herein may further include operations, features, means, or instructions for transmitting a grant for uplink shared channel resources to the UE in response to the SR message, and receiving the report via the uplink shared channel resources indicated by the grant.

Some examples of the method, apparatuses, and non-transitory computer-readable medium described herein may further include operations, features, means, or instructions for receiving the report via the PUCCH after transmission of the indication of the beam failure.

Some examples of the method, apparatuses, and non-transitory computer-readable medium described herein may further include operations, features, means, or instructions for receiving the report after expiration of a time duration following receipt of the indication of the beam failure, the time duration associated with a number of symbols or a fixed time interval.

Some examples of the method, apparatuses, and non-transitory computer-readable medium described herein may further include operations, features, means, or instructions for transmitting, to the UE, a request for the report via a downlink control channel, where the report may be received in response to the request.

Some examples of the method, apparatuses, and non-transitory computer-readable medium described herein may further include operations, features, means, or instructions for transmitting the request via a PDCCH or a dedicated PDCCH, where the request includes a grant for uplink shared channel resources for the UE, and receiving the report via the uplink shared channel resources for the UE indicated by the grant.

Some examples of the method, apparatuses, and non-transitory computer-readable medium described herein may further include operations, features, means, or instructions for receiving the indication of the beam failure of the first beam in a dedicated SR message, transmitting the request for the report to the UE in response to the dedicated SR message, and receiving the report via a PUCCH in response to the request.

Some examples of the method, apparatuses, and non-transitory computer-readable medium described herein may further include operations, features, means, or instructions for transmitting the request within a time window after receipt of the indication of the beam failure.

In some examples of the method, apparatuses, and non-transitory computer-readable medium described herein, the request may be associated with a DCI format for the downlink control channel.

Some examples of the method, apparatuses, and non-transitory computer-readable medium described herein may further include operations, features, means, or instructions for modifying a transmission configuration for a downlink beam for the second communication link according to the second beam, where the modified transmission configuration includes an autonomously activated TCI state based on a report indicating the second beam for communicating with the UE via the second communication link, and where the report explicitly indicates that the second beam is preferred or the report includes beam characteristics for at least the second beam.

DETAILED DESCRIPTION

Figure 1:
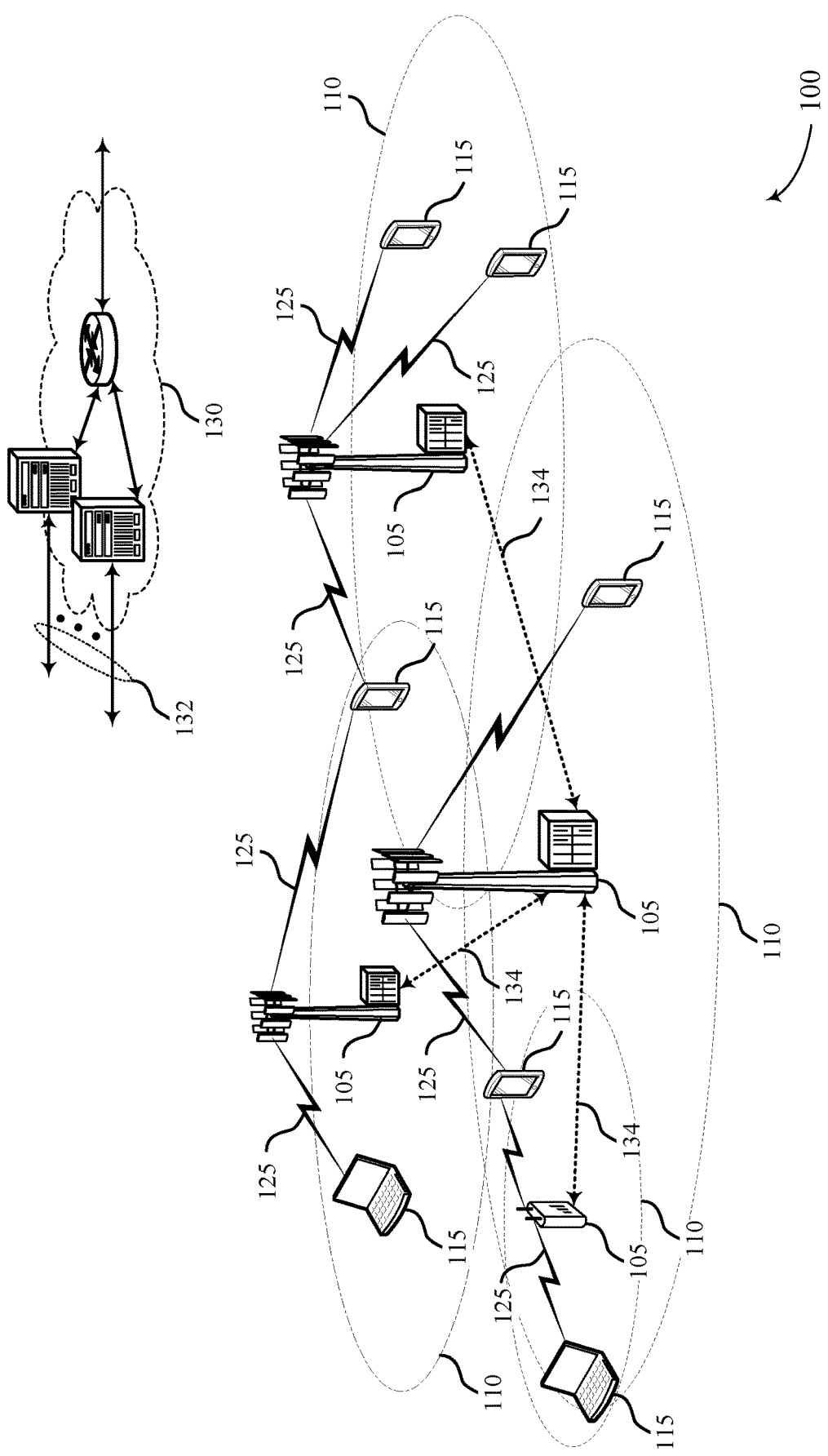
FIG. 1 illustrates an example of a wireless communications system that supports aspects of the present disclosure.

In some wireless communications systems, a user equipment (UE) may be configured to communicate with a base station (or multiple base stations) via a primary cell (PCell) and one or more secondary cells (SCells). In systems employing beamforming (e.g., in New Radio (NR) or millimeter wave (mmW) systems), a downlink beam may be configured for transmissions from base station and an uplink beam may be configured for transmission from the UE. Downlink beams and uplink beams may be configured differently for the PCell and the SCell and if the current downlink beam used for SCell communications degrades or fails (e.g., some connections diminish over time due to movement within a coverage area, interference from neighboring devices, or other factors), a beam recovery procedure may be initiated. The beam recovery procedure may involve activation of a new transmission configuration at a base station via a medium access control (MAC) control element (MAC-CE). Such a procedure may be robust, but may result in increased latency or may be unsuccessful.

The described techniques relate to improved methods, systems, devices, and apparatuses that support autonomous transmission configuration updating. Generally, the described techniques provide for more efficient beam failure recovery when a UE supports communication on multiple cells (e.g., PCell and one or more SCells). According to some aspects, a base station may transmit (e.g., periodically, aperiodically, or continuously) a downlink reference signal (DLRS) via the SCell which may be monitored by the UE. The DLRS may be transmitted over a set of downlink beams from the base station including a current downlink beam used for communications with the UE. If the current downlink beam degrades or fails, the UE may transmit an indication of the degradation or failure via the PCell. The indication may be transmitted in a scheduling request (SR) via a physical uplink control channel (PUCCH) of the PCell, or may be included in a dedicated SR message configured for indications of beam failure, which may also be transmitted on the PCell.

After receiving the indication, the base station may request an uplink report from the UE or alternatively, may monitor a set of resources after receipt of the indication for the uplink report, which may be transmitted by the UE without having received a request from the base station (e.g., the base station may not transmit a request to the UE). The report may be transmitted via the PCell and may be included in a PUCCH transmission or via resources indicated by an uplink grant from the base station that was transmitted in response to the SR.

The report may include an indication of a transmission beam to use for subsequent communications on the SCell. For example, the UE may continue to monitor DLRSs from the base station over a set of beams, and determine candidate beams for subsequent communications on the SCell. In such cases, the UE may select one of the candidate beams based on a measured parameter (e.g., a preferred beam such as a candidate beam having a higher reference signal received power (RSRP) (or other parameter) compared to the current beam that is degrading), and include the selected beam in the report to the base station. The base station may then modify its transmission configuration (e.g., transmission configuration indicator (TCI) state) for the SCell and continue communications with the UE via the selected beam as indicated in the report. After the downlink beam for SCell communications is recovered, the uplink beam for transmission from the UE to the base station via the SCell may be recovered, which may occur after a set number of symbols following recovery of the downlink beam.

Aspects of the disclosure are initially described in the context of wireless communications systems. Aspects are then described with respect to process flows. Aspects of the disclosure are further illustrated by and described with reference to apparatus diagrams, system diagrams, and flowcharts that relate to autonomous transmission configuration updating.

FIG. 1 illustrates an example of a wireless communications system 100 that supports aspects of the present disclosure. The wireless communications system 100 includes base stations 105, UEs 115, and a core network 130. In some examples, the wireless communications system 100 may be a Long Term Evolution (LTE) network, an LTE-Advanced (LTE-A) network, an LTE-A Pro network, or an NR network. In some cases, wireless communications system 100 may support enhanced broadband communications, ultra-reliable (e.g., mission critical) communications, low latency communications, or communications with low-cost and low-complexity devices.

Base stations 105 may wirelessly communicate with UEs 115 via one or more base station antennas. Base stations 105 described herein may include or may be referred to by those skilled in the art as a base transceiver station, a radio base station, an access point, a radio transceiver, a NodeB, an eNodeB (eNB), a next-generation NodeB or giga-NodeB (either of which may be referred to as a gNB), a Home NodeB, a Home eNodeB, or some other suitable terminology. Wireless communications system 100 may include base stations 105 of different types (e.g., macro or small cell base stations 105). The UEs 115 described herein may be able to communicate with various types of base stations 105 and network equipment including macro eNBs, small cell eNBs, gNBs, relay base stations 105, and the like.

Each base station 105 may be associated with a particular geographic coverage area 110 in which communications with various UEs 115 is supported. Each base station 105 may provide communication coverage for a respective geographic coverage area 110 via communication links 125, and communication links 125 between a base station 105 and a UE 115 may utilize one or more carriers. Communication links 125 shown in wireless communications system 100 may include uplink transmissions from a UE 115 to a base station 105, or downlink transmissions from a base station 105 to a UE 115. Downlink transmissions may also be called forward link transmissions while uplink transmissions may also be called reverse link transmissions.

The geographic coverage area 110 for a base station 105 may be divided into sectors making up a portion of the geographic coverage area 110, and each sector may be associated with a cell. For example, each base station 105 may provide communication coverage for a macro cell, a small cell, a hot spot, or other types of cells, or various combinations thereof. In some examples, a base station 105 may be movable and therefore provide communication coverage for a moving geographic coverage area 110. In some examples, different geographic coverage areas 110 associated with different technologies may overlap, and overlapping geographic coverage areas 110 associated with different technologies may be supported by the same base station 105 or by different base stations 105. The wireless communications system 100 may include, for example, a heterogeneous LTE/LTE-A/LTE-A Pro or NR network in which different types of base stations 105 provide coverage for various geographic coverage areas 110.

The term "cell" refers to a logical communication entity used for communication with a base station 105 (e.g., over a carrier), and may be associated with an identifier for distinguishing neighboring cells (e.g., a physical cell identifier (PCID), a virtual cell identifier (VCID)) operating via the same or a different carrier. In some examples, a carrier may support multiple cells, and different cells may be configured according to different protocol types (e.g., machine-type communication (MTC), narrowband Internet-of-Things (NB-IoT), enhanced mobile broadband (eMBB), or others) that may provide access for different types of devices. In some cases, the term "cell" may refer to a portion of a geographic coverage area 110 (e.g., a sector) over which the logical entity operates.

UEs 115 may be dispersed throughout the wireless communications system 100, and each UE 115 may be stationary or mobile. A UE 115 may also be referred to as a mobile device, a wireless device, a remote device, a handheld device, or a subscriber device, or some other suitable terminology, where the "device" may also be referred to as a unit, a station, a terminal, or a client. A UE 115 may also be a personal electronic device such as a cellular phone, a personal digital assistant (PDA), a tablet computer, a laptop computer, or a personal computer. In some examples, a UE 115 may also refer to a wireless local loop (WLL) station, an Internet of Things (IoT) device, an Internet of Everything (IoE) device, or an MTC device, or the like, which may be implemented in various articles such as appliances, vehicles, meters, or the like.

Some UEs 115, such as MTC or IoT devices, may be low cost or low complexity devices, and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay that information to a central server or application program that can make use of the information or present the information to humans interacting with the program or application. Some UEs 115 may be designed to collect information or enable automated behavior of machines. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples, half-duplex communications may be performed at a reduced peak rate. Other power conservation techniques for UEs 115 include entering a power saving "deep sleep" mode when not engaging in active communications, or operating over a limited bandwidth (e.g., according to narrowband communications). In some cases, UEs 115 may be designed to support critical functions (e.g., mission critical functions), and a wireless communications system 100 may be configured to provide ultra-reliable communications for these functions.

In some cases, a UE 115 may also be able to communicate directly with other UEs 115 (e.g., using a peer-to-peer (P2P) or device-to-device (D2D) protocol). One or more of a group of UEs 115 utilizing D2D communications may be within the geographic coverage area 110 of a base station 105. Other UEs 115 in such a group may be outside the geographic coverage area 110 of a base station 105, or be otherwise unable to receive transmissions from a base station 105. In some cases, groups of UEs 115 communicating via D2D communications may utilize a one-to-many (1:M) system in which each UE 115 transmits to every other UE 115 in the group. In some cases, a base station 105 facilitates the scheduling of resources for D2D communications. In other cases, D2D communications are carried out between UEs 115 without the involvement of a base station 105.

Base stations 105 may communicate with the core network 130 and with one another. For example, base stations 105 may interface with the core network 130 through backhaul links 132 (e.g., via an S1, N2, N3, or other interface). Base stations 105 may communicate with one another over backhaul links 134 (e.g., via an X2, Xn, or other interface) either directly (e.g., directly between base stations 105) or indirectly (e.g., via core network 130).

The core network 130 may provide user authentication, access authorization, tracking, Internet Protocol (IP) connectivity, and other access, routing, or mobility functions. The core network 130 may be an evolved packet core (EPC), which may include at least one mobility management entity (MME), at least one serving gateway (S-GW), and at least one Packet Data Network (PDN) gateway (P-GW). The MME may manage non-access stratum (e.g., control plane) functions such as mobility, authentication, and bearer management for UEs 115 served by base stations 105 associated with the EPC. User IP packets may be transferred through the S-GW, which itself may be connected to the P-GW. The P-GW may provide IP address allocation as well as other functions. The P-GW may be connected to the network operators IP services. The operators IP services may include access to the Internet, Intranet(s), an IP Multimedia Subsystem (IMS), or a Packet-Switched (PS) Streaming Service.

At least some of the network devices, such as a base station 105, may include subcomponents such as an access network entity, which may be an example of an access node controller (ANC). Each access network entity may communicate with UEs 115 through a number of other access network transmission entities, which may be referred to as a radio head, a smart radio head, or a transmission reception point (TRP). In some configurations, various functions of each access network entity or base station 105 may be distributed across various network devices (e.g., radio heads and access network controllers) or consolidated into a single network device (e.g., a base station 105).

Wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band, since the wavelengths range from approximately one decimeter to one meter in length. UHF waves may be blocked or redirected by buildings and environmental features. However, the waves may penetrate structures sufficiently for a macro cell to provide service to UEs 115 located indoors. Transmission of UHF waves may be associated with smaller antennas and shorter range (e.g., less than 100 kilometers (km)) compared to transmission using the smaller frequencies and longer waves of the high frequency (HF) or very high frequency (VHF) portion of the spectrum below 300 MHz.

Wireless communications system 100 may also operate in a super high frequency (SHF) region using frequency bands from 3 GHz to 30 GHz, also known as the centimeter band. The SHF region includes bands such as the 5 GHz industrial, scientific, and medical (ISM) bands, which may be used opportunistically by devices that may be capable of tolerating interference from other users.

Wireless communications system 100 may also operate in an extremely high frequency (EHF) region of the spectrum (e.g., from 30 GHz to 300 GHz), also known as the millimeter band. In some examples, wireless communications system 100 may support mmW communications between UEs 115 and base stations 105, and EHF antennas of the respective devices may be even smaller and more closely spaced than UHF antennas. In some cases, this may facilitate use of antenna arrays within a UE 115. However, the propagation of EHF transmissions may be subject to even greater atmospheric attenuation and shorter range than SHF or UHF transmissions. Techniques disclosed herein may be employed across transmissions that use one or more different frequency regions, and designated use of bands across these frequency regions may differ by country or regulating body.

In some cases, wireless communications system 100 may utilize both licensed and unlicensed radio frequency spectrum bands. For example, wireless communications system 100 may employ License Assisted Access (LAA), LTE-Unlicensed (LTE-U) radio access technology, or NR technology in an unlicensed band such as the 5 GHz ISM band. When operating in unlicensed radio frequency spectrum bands, wireless devices such as base stations 105 and UEs 115 may employ listen-before-talk (LBT) procedures to ensure a frequency channel is clear before transmitting data. In some cases, operations in unlicensed bands may be based on a carrier aggregation configuration in conjunction with component carriers operating in a licensed band (e.g., LAA). Operations in unlicensed spectrum may include downlink transmissions, uplink transmissions, peer-to-peer transmissions, or a combination of these. Duplexing in unlicensed spectrum may be based on frequency division duplexing (FDD), time division duplexing (TDD), or a combination of both.

In some examples, base station 105 or UE 115 may be equipped with multiple antennas, which may be used to employ techniques such as transmit diversity, receive diversity, multiple-input multiple-output (MIMO) communications, or beamforming. For example, wireless communications system 100 may use a transmission scheme between a transmitting device (e.g., a base station 105) and a receiving device (e.g., a UE 115), where the transmitting device is equipped with multiple antennas and the receiving device is equipped with one or more antennas. MIMO communications may employ multipath signal propagation to increase the spectral efficiency by transmitting or receiving multiple signals via different spatial layers, which may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream, and may carry bits associated with the same data stream (e.g., the same codeword) or different data streams. Different spatial layers may be associated with different antenna ports used for channel measurement and reporting. MIMO techniques include single-user MIMO (SU-MIMO) where multiple spatial layers are transmitted to the same receiving device, and multiple-user MIMO (MU-MIMO) where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105 or a UE 115) to shape or steer an antenna beam (e.g., a transmit beam or receive beam) along a spatial path between the transmitting device and the receiving device. Beamforming may be achieved by combining the signals communicated via antenna elements of an antenna array such that signals propagating at particular orientations with respect to an antenna array experience constructive interference while others experience destructive interference. The adjustment of signals communicated via the antenna elements may include a transmitting device or a receiving device applying amplitude and phase offsets to signals carried via each of the antenna elements associated with the device. The adjustments associated with each of the antenna elements may be defined by a beamforming weight set associated with a particular orientation (e.g., with respect to the antenna array of the transmitting device or receiving device, or with respect to some other orientation).

In one example, a base station 105 may use multiple antennas or antenna arrays to conduct beamforming operations for directional communications with a UE 115. For instance, some signals (e.g., synchronization signals, reference signals, beam selection signals, or other control signals) may be transmitted by a base station 105 multiple times in different directions, which may include a signal being transmitted according to different beamforming weight sets associated with different directions of transmission. Transmissions in different beam directions may be used to identify (e.g., by the base station 105 or a receiving device, such as a UE 115) a beam direction for subsequent transmission or reception by the base station 105.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based at least in in part on a signal that was transmitted in different beam directions. For example, a UE 115 may receive one or more of the signals transmitted by the base station 105 in different directions, and the UE 115 may report to the base station 105 an indication of the signal it received with a highest signal quality, or an otherwise acceptable signal quality. Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115), or transmitting a signal in a single direction (e.g., for transmitting data to a receiving device).

A receiving device (e.g., a UE 115, which may be an example of a mmW receiving device) may try multiple receive beams when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets applied to signals received at a set of antenna elements of an antenna array, or by processing received signals according to different receive beamforming weight sets applied to signals received at a plurality of antenna elements of an antenna array, any of which may be referred to as "listening" according to different receive beams or receive directions. In some examples, a receiving device may use a single receive beam to receive along a single beam direction (e.g., when receiving a data signal). The single receive beam may be aligned in a beam direction determined based at least in part on listening according to different receive beam directions (e.g., a beam direction determined to have a highest signal strength, highest signal-to-noise ratio, or otherwise acceptable signal quality based at least in part on listening according to multiple beam directions).

In some cases, the antennas of a base station 105 or UE 115 may be located within one or more antenna arrays, which may support MIMO operations, or transmit or receive beamforming. For example, one or more base station antennas or antenna arrays may be co-located at an antenna assembly, such as an antenna tower. In some cases, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations.

In some cases, wireless communications system 100 may be a packet-based network that operate according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A MAC layer may perform priority handling and multiplexing of logical channels into transport channels. The MAC layer may also use hybrid automatic repeat request (HARQ) to provide retransmission at the MAC layer to improve link efficiency. In the control plane, the Radio Resource Control (RRC) protocol layer may provide establishment, configuration, and maintenance of an RRC connection between a UE 115 and a base station 105 or core network 130 supporting radio bearers for user plane data. At the Physical layer, transport channels may be mapped to physical channels.

In some cases, UEs 115 and base stations 105 may support retransmissions of data to increase the likelihood that data is received successfully. HARQ feedback is one technique of increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., signal-to-noise conditions). In some cases, a wireless device may support same-slot HARQ feedback, where the device may provide HARQ feedback in a specific slot for data received in a previous symbol in the slot. In other cases, the device may provide HARQ feedback in a subsequent slot, or according to some other time interval.

Time intervals in LTE or NR may be expressed in multiples of a basic time unit, which may, for example, refer to a sampling period of $T_s=1/30,720,000$ seconds. Time intervals of a communications resource may be organized according to radio frames each having a duration of 10 milliseconds (ms), where the frame period may be expressed as $T_f=307,200$ $T_s$. The radio frames may be identified by a system frame number (SFN) ranging from 0 to 1023. Each frame may include 10 subframes numbered from 0 to 9, and each subframe may have a duration of 1 ms. A subframe may be further divided into 2 slots each having a duration of 0.5 ms, and each slot may contain 6 or 7 modulation symbol periods (e.g., depending on the length of the cyclic prefix prepended to each symbol period). Excluding the cyclic prefix, each symbol period may contain 2048 sampling periods. In some cases, a subframe may be the smallest scheduling unit of the wireless communications system 100, and may be referred to as a transmission time interval (TTI). In other cases, a smallest scheduling unit of the wireless communications system 100 may be shorter than a subframe or may be dynamically selected (e.g., in bursts of shortened TTIs (sTTIs) or in selected component carriers using sTTIs).

In some wireless communications systems, a slot may further be divided into multiple mini-slots containing one or more symbols. In some instances, a symbol of a mini-slot or a mini-slot may be the smallest unit of scheduling. Each symbol may vary in duration depending on the subcarrier spacing or frequency band of operation, for example. Further, some wireless communications systems may implement slot aggregation in which multiple slots or mini-slots are aggregated together and used for communication between a UE 115 and a base station 105.

The term "carrier" refers to a set of radio frequency spectrum resources having a defined physical layer structure for supporting communications over a communication link 125. For example, a carrier of a communication link 125 may include a portion of a radio frequency spectrum band that is operated according to physical layer channels for a given radio access technology. Each physical layer channel may carry user data, control information, or other signaling. A carrier may be associated with a pre-defined frequency channel (e.g., an evolved universal mobile telecommunication system terrestrial radio access (E-UTRA) absolute radio frequency channel number (EARFCN)), and may be positioned according to a channel raster for discovery by UEs 115. Carriers may be downlink or uplink (e.g., in an FDD mode), or be configured to carry downlink and uplink communications (e.g., in a TDD mode). In some examples, signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)).

The organizational structure of the carriers may be different for different radio access technologies (e.g., LTE, LTE-A, LTE-A Pro, NR). For example, communications over a carrier may be organized according to TTIs or slots, each of which may include user data as well as control information or signaling to support decoding the user data. A carrier may also include dedicated acquisition signaling (e.g., synchronization signals or system information, etc.) and control signaling that coordinates operation for the carrier. In some examples (e.g., in a carrier aggregation configuration), a carrier may also have acquisition signaling or control signaling that coordinates operations for other carriers.

Physical channels may be multiplexed on a carrier according to various techniques. A physical control channel and a physical data channel may be multiplexed on a downlink carrier, for example, using time division multiplexing (TDM) techniques, frequency division multiplexing (FDM)

techniques, or hybrid TDM-FDM techniques. In some examples, control information transmitted in a physical control channel may be distributed between different control regions in a cascaded manner (e.g., between a common control region or common search space and one or more UE-specific control regions or UE-specific search spaces).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of predetermined bandwidths for carriers of a particular radio access technology (e.g., 1.4, 3, 5, 10, 15, 20, 40, or 80 MHz). In some examples, each served UE 115 may be configured for operating over portions or all of the carrier bandwidth. In other examples, some UEs 115 may be configured for operation using a narrowband protocol type that is associated with a predefined portion or range (e.g., set of subcarriers or resource blocks (RBs)) within a carrier (e.g., "in-band" deployment of a narrowband protocol type).

In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme). Thus, the more resource elements that a UE 115 receives and the higher the order of the modulation scheme, the higher the data rate may be for the UE 115. In MIMO systems, a wireless communications resource may refer to a combination of a radio frequency spectrum resource, a time resource, and a spatial resource (e.g., spatial layers), and the use of multiple spatial layers may further increase the data rate for communications with a UE 115.

Devices of the wireless communications system 100 (e.g., base stations 105 or UEs 115) may have a hardware configuration that supports communications over a particular carrier bandwidth, or may be configurable to support communications over one of a set of carrier bandwidths. In some examples, the wireless communications system 100 may include base stations 105 or UEs 115 that support simultaneous communications via carriers associated with more than one different carrier bandwidth.

Wireless communications system 100 may support communication with a UE 115 on multiple cells or carriers, a feature which may be referred to as carrier aggregation or multi-carrier operation. A UE 115 may be configured with multiple downlink component carriers and one or more uplink component carriers according to a carrier aggregation configuration. Carrier aggregation may be used with both FDD and TDD component carriers.

In some cases, wireless communications system 100 may utilize enhanced component carriers (eCCs). An eCC may be characterized by one or more features including wider carrier or frequency channel bandwidth, shorter symbol duration, shorter TTI duration, or modified control channel configuration. In some cases, an eCC may be associated with a carrier aggregation configuration or a dual connectivity configuration (e.g., when multiple serving cells have a suboptimal or non-ideal backhaul link). An eCC may also be configured for use in unlicensed spectrum or shared spectrum (e.g., where more than one operator is allowed to use the spectrum). An eCC characterized by wide carrier bandwidth may include one or more segments that may be utilized by UEs 115 that are not capable of monitoring the whole carrier bandwidth or are otherwise configured to use a limited carrier bandwidth (e.g., to conserve power).

In some cases, an eCC may utilize a different symbol duration than other component carriers, which may include use of a reduced symbol duration as compared with symbol durations of the other component carriers. A shorter symbol duration may be associated with increased spacing between adjacent subcarriers. A device, such as a UE 115 or base station 105, utilizing eCCs may transmit wideband signals (e.g., according to frequency channel or carrier bandwidths of 20, 40, 60, 80 MHz, etc.) at reduced symbol durations (e.g., 16.67 microseconds (μs)). A TTI in eCC may consist of one or multiple symbol periods. In some cases, the TTI duration (that is, the number of symbol periods in a TTI) may be variable.

Wireless communications system 100 may be an NR system that may utilize any combination of licensed, shared, and unlicensed spectrum bands, among others. The flexibility of eCC symbol duration and subcarrier spacing may allow for the use of eCC across multiple spectrums. In some examples, NR shared spectrum may increase spectrum utilization and spectral efficiency, specifically through dynamic vertical (e.g., across the frequency domain) and horizontal (e.g., across the time domain) sharing of resources.

In some cases, a UE 115 and a base station 105 may support communications via multiple cells (e.g., a PCell and one or more SCells). When utilizing beamforming, a downlink transmission beam used by the base station 105 for communications with the UE 115 over an SCell may degrade or fail (e.g., the quality of received signals transmitted using the downlink transmission beam may fall below a threshold). Once detected, the UE 115 may transmit an indication of the beam failure to the base station 105 via the PCell. The indication may be transmitted in an SR or dedicated SR (e.g., via PUCCH), and the UE 115 may then monitor reference signals from the base station 105 via other downlink transmission beams of the SCell to determine a candidate beam for subsequent communications. The SR transmission in the PUCCH may be an example of a PUCCH-beam failure recovery request (PUCCH-BFR). In some cases, the base station 105 may transmit a request for a beam to use for subsequent communications and in other cases, the UE 115 may transmit an indication of the beam to use for subsequent communications (e.g., based on measured parameters of the candidate beams on the SCell) without having received a request from the base station 105. The report may be transmitted via the PCell and the base station 105 may receive the report and modify its transmission configured to perform subsequent SCell communications with the UE 115 via the beam indicated in the report. After a set number of symbols or time, the uplink transmission beam for the SCell may also be recovered.

Figure 2:
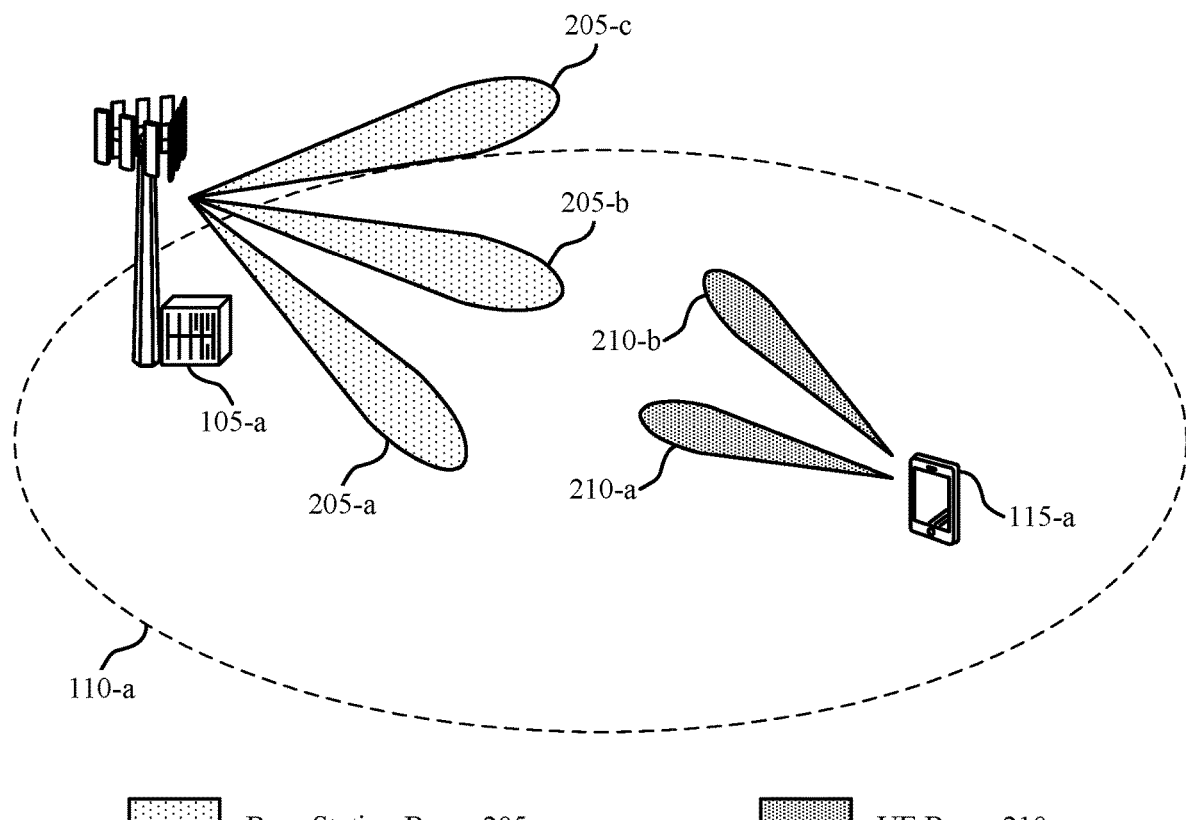
FIG. 2 illustrates an example of a wireless communications system that supports aspects of the present disclosure.

FIG. 2 illustrates an example of a wireless communications system 200 that supports aspects of the present disclosure. In some examples, wireless communications system 200 may implement aspects of wireless communications system 100.

In wireless communications system 200, base station 105-a may support communications for UE 115-a within a geographic coverage area 110-a. In some examples, base station 105-a may utilize beamforming techniques to communicate with UE 115-a. For example, base station 105-a may transmit and receive communications using one or more of base station beams 205-a, 205-b, and 205-c, and UE 115-a may transmit and receive using UE beams 210-a and 210-b.

Some wireless devices, such as UE 115-a may be configured to operate using one or more communication links, each of which may correspond to a cell (e.g., PCell or a SCell) used for communication with base station 105-*a*. For instance, a UE 115-*a* may be configured to communicate with base station 105-*a* via a PCell and one or more SCells. In some cases, the PCell may be more reliable and have beams with stronger reference signals (e.g., the PCell may operate in sub-6 GHz, may be associated with higher signal to interference plus noise ratio (SINR), or may be capable of a higher transmission power). The PCell may also be utilized for the communication of control information between the base station 105 and the UE 115-*a*. The SCell may be less reliable than the PCell or may be associated with particular communication types (the SCell may be associated with data communications, communications via a mmW band, etc.). Connection by a UE 115 to an SCell may be configured by base station 105-*a* or another network device (e.g., a core network node).

To reduce (e.g., minimize) latency and improve reliability in wireless communications system 200, UE 115-*a* may monitor (e.g., periodically, continuously) base station beams 205, which may support communications via the SCell. For example, a base station 105-*a* may periodically transmit DLRS to UE 115-*a* and the UE 115-*a* may monitor a set of beams (e.g., base station beams 205-*a* and 205-*b*) over which the DLRS is transmitted. UE 115-*a* may perform physical layer measurements of layer 1 (L1) characteristics for one or more base station beams 205 and determine that some downlink base station beams 205 may diminish or fail over time in terms of available power or other characteristics associated with the physical layer. Such characteristics may be referred to as L1 characteristics and may include RSRP, reference signal received quality (RSRQ), SINR, or other signal measurements.

According to some aspects, when a base station beam 205 is insufficient, diminishing, or failing (e.g., a measured parameter such as SINR, RSRP, etc. falls below a threshold) for SCell communications, UE 115-*a* may search for another base station beam 205 for subsequent communications (e.g., UE 115-*a* may determine a set of candidate base station beams 205 having a measured parameters that exceed the threshold). In some examples, one or more candidate base station beams 205 may be determined based on L1 characteristics (e.g., using measurements performed by the UE 115-*a*).

In some cases, UE 115-*a* may utilize base station beam 205-*c* for PCell communications and base station beam 205-*a* for SCell communications. During monitoring of one or more base station beams 205, UE 115-*a* may determine that base station beam 205-*a* used for SCell communications is degrading or has failed, and the UE 115-*a* may then decide to switch to a new base station beam 205 for subsequent SCell communications. In some instances, a failing beam may be an example of an L1 event because the failure of the beam may be detected based on a change in L1 measurement criteria for that beam. Upon failure of base station beam 205-*a*, the UE 115-*a* and base station 105-*a* may perform a beam recovery procedure that involves changing the TCI state at the base station 105-*a* (e.g., a TCI state reconfiguration) in order to recover a base station beam 205 for subsequent communications via the SCell.

For example, UE 115-*a* may detect an L1 event, which may indicate to the UE 115-*a* that base station beam 205-*a* from base station 105-*a* supporting SCell communications may be failing. UE 115-*a* may transmit an indication of this event to base station 105-*a* through the PCell. In some cases, upon receipt of the indication, base station 105-*a* may transmit a request for an L1 report containing a selected (e.g., a preferred) base station beam 205 for subsequent SCell communications. In response, the UE 115-*a* may transmit an L1 report to the base station 105-*a*, which may include a selected base station beam 205 (e.g., the UE 115-*a* may select base station beam 205-*b* based on L1 measurements associated with base station beam 205-*b*) for SCell communications. In other cases, UE 115-*a* may transmit an L1 report to base station 105-*a* over the PCell regardless of whether the UE 115-*a* received a request from the base station 105-*a*. For example, UE 115-*a* may transmit the report after a preset time duration following transmission of the indication of the beam failure.

After base station 105-*a* has received the L1 report, which may indicate that base station beam 205-*b* is selected by UE 115-*a* for subsequent SCell communications, base station 105-*a* may update its TCI state to support SCell communications via base station beam 205-*b*. Thus, techniques described herein may provide signaling for the TCI state to be updated autonomously (e.g., based on beam information reporting, such as the L1 report as described herein, without the process used in existing TCI state update techniques). Further, cases of successful activation of the updated TCI state may provide lower latency in wireless communications systems, such as wireless communications system 200.

In some cases, the activation of the new TCI state may fail and UE 115-*a* may not be able to communicate on the new beam. In this case, a MAC-CE based process may begin. In this process, UE 115-*a* may send a random access channel (RACH) message (e.g., RACH message 1) on the candidate base station beam 205-*b* in order to initiate communication. UE 115-*a* may wait for a physical downlink control channel (PDCCH) message from the base station 105-*b* in response to the RACH message. The PDCCH message may be addressed to a cell radio network temporary identifier (C-RNTI) in the recovery control resource set (CORESET). In this case, the CORESET may be configured through RRC, and may be configured through the SCell in which UE 115-*a* is attempting to recover a beam. After a PDCCH message is received by UE 115-*a* from the SCell, the TCI state at the base station 105-*a* may be activated through a MAC-CE transmitted to UE 115-*a* using base station beam 205-*b* via the SCell. After a preset time, which may be configured by a base station 105-*a*, UE 115-*a* may switch to the new candidate base station beam 205-*b*.

Figure 3:
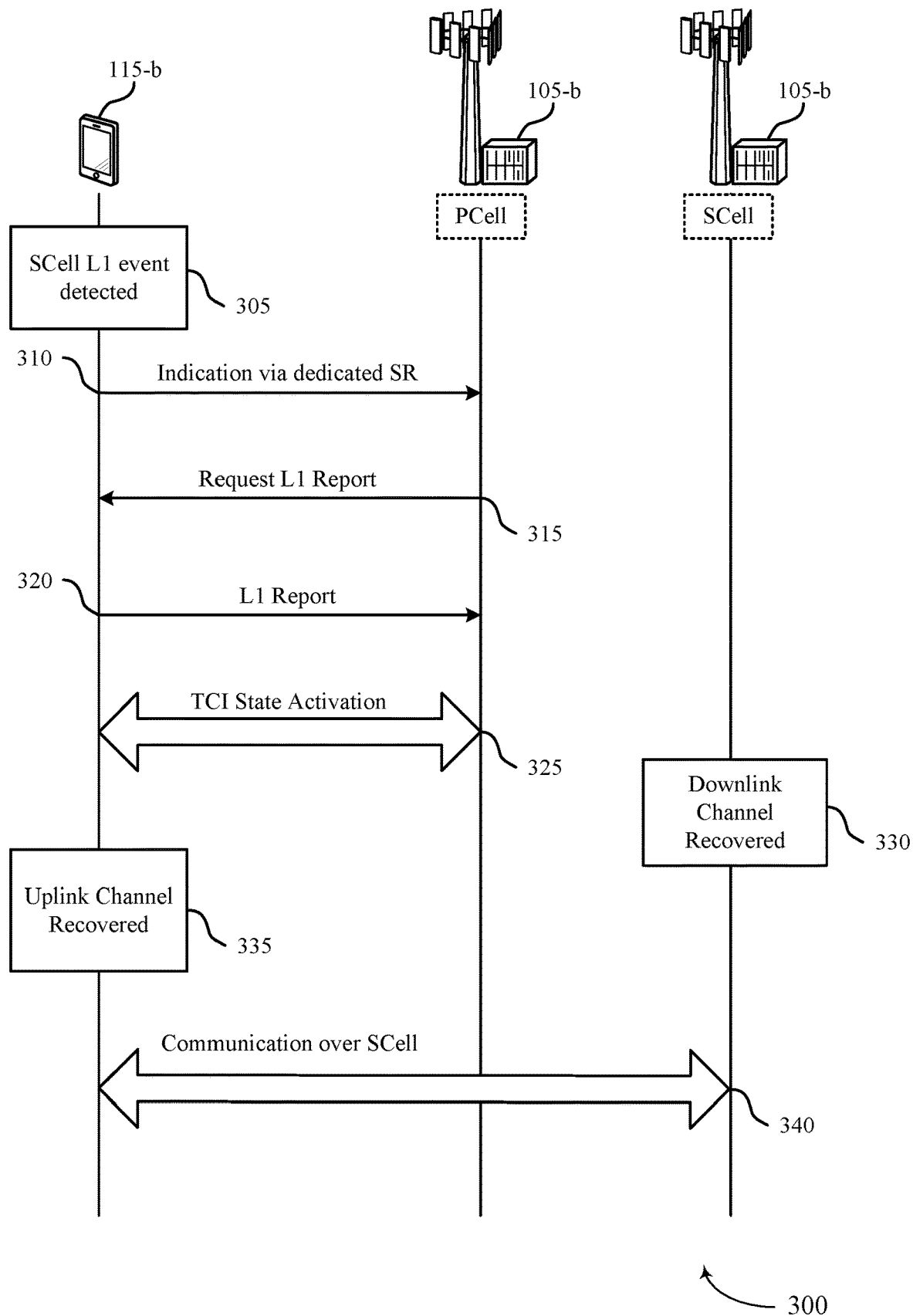
FIGS. 3 through 5 illustrate example process flows that support aspects of the present disclosure.

FIG. 3 illustrates an example of a process flow 300 that supports aspects of the present disclosure. In some examples, process flow 300 may implement aspects of wireless communications system 100. Process flow 300 may be implemented by UE 115-*b* and a base station 105-*b*, and base station 105-*b* may support communications for UE 115-*b* over a PCell and an SCell. In other examples, process flow 300 may be implemented by multiple base stations supporting one or more SCell communication links for UE 115-*b*.

At 305, UE 115-*b* may detect that a current downlink beam used for SCell communications with base station 105-*b* may be degrading or failing (e.g., based on a one or more L1 measurements of the current downlink beam).

At 310, UE 115-*b* may send an indication that the current downlink beam for SCell communications is failing to base station 105-*b*. The indication may include that one of the beams the UE 115-*b* is connected to for SCell communications may be failing, or that another L1 event has occurred. The indication may be transmitted from UE 115-*b* to base station 105-*b* over the PCell in a dedicated SR, which may be an SR configured for beam failure indications. The dedicated SR may be transmitted via a resource set of the PCell allocated for such an indication. In some cases, the dedicated SR may also include information regarding the number of attempts UE 115-*b* may have made to transmit the indication of the L1 event or a time duration associated with how long UE 115-*b* may wait for a response from base station 105-*b*. The time duration may be preconfigured by base station 105-*b*. In some instances, UE 115-*b* may not have a dedicated SR configured and instead may utilize a standard SR or via SR sweeping, which may include a request for resources for an uplink shared channel transmission (e.g., a physical uplink shared channel (PUSCH)) over which the UE may transmit the L1 report (at 320). In one example, the transmission of the indication from UE 115-*b* indicates to base station 105-*b* TCI reconfiguration is autonomous.

At 315, base station 105-*b* may transmit a request for an L1 report from UE 115-*b*. The L1 report may include a list of candidate beams and corresponding L1 metrics or a selected (e.g., preferred) beam for subsequent SCell communications. The request from base station 105-*b* may be transmitted via a dedicated PDCCH in a format (e.g., a downlink control information (DCI) format) configured for such a request and in some cases, the UE 115-*b* may expect to receive the request from base station 105-*b* within a specific time duration after the transmitting the indication of the L1 event. The format of the PDCCH or the time duration may be configured by the base station 105-*b* or may be in accordance with a standard. In some examples, a special DCI transmission may be utilized for transmission of the request, which may include a number of bits or fields designated for requesting the L1 report from UE 115-*b*. Further, the information transmitted via the PDCCH may be scrambled according to a scrambling sequence for the UE 115-*b* or for a PDCCH or DCI transmission designated for requesting the L1 report. For example, the PDCCH transmission may be scrambled by a unique sequence that is specific to requesting the L1 report from UE 115-*b*.

At 320, UE 115-*b* may transmit the L1 report to base station 105-*b* in response to the request transmitted at 315 over the PCell. The L1 report may be transmitted in a PUCCH or in MAC-CE signaling (e.g., in a PUSCH), or in other types of signaling. For example, the UE 115-*b* may descramble the request for the L1 report transmitted at 315 according to the unique sequence or identify a DCI format for requesting the L1 report, and transmit the L1 report accordingly. UE 115-*b* may send the L1 report via a PUCCH or via uplink shared channel resources in a case where the base station 105-*b* included an uplink grant in response to the SR message from the UE 115-*b*. The L1 report may include a selected beam for subsequent SCell communications.

Based on the L1 report, base station 105-*b* may activate a new TCI state to reconfigure its communication beam for SCell communications. At 325, the new TCI state may be activated. For instance, base station 105-*b* may indicate to the UE 115-*b* that it may switch to one of the candidate beams included in the L1 report or may switch to the beam identified in the L1 report without indicating to the UE 115-*b*.

At 330, the downlink channel (e.g., SCell beam) may be recovered by base station 105-*b* based on the TCI state activation at 325.

Based on the TCI activation, at 335 UE 115-*b* may reconfigure an uplink beam for SCell communications based on the selected beam included in the L1 report in order to recover the uplink channel. In some cases, the uplink beam for SCell communications may be recovered after a time duration or after a number of symbols after sending the L1 report (at 320) or after downlink channel recovery at 330.

At 340, UE 115-*b* may communicate over the SCell using the updated beam with base station 105-*b*.

Figure 4:
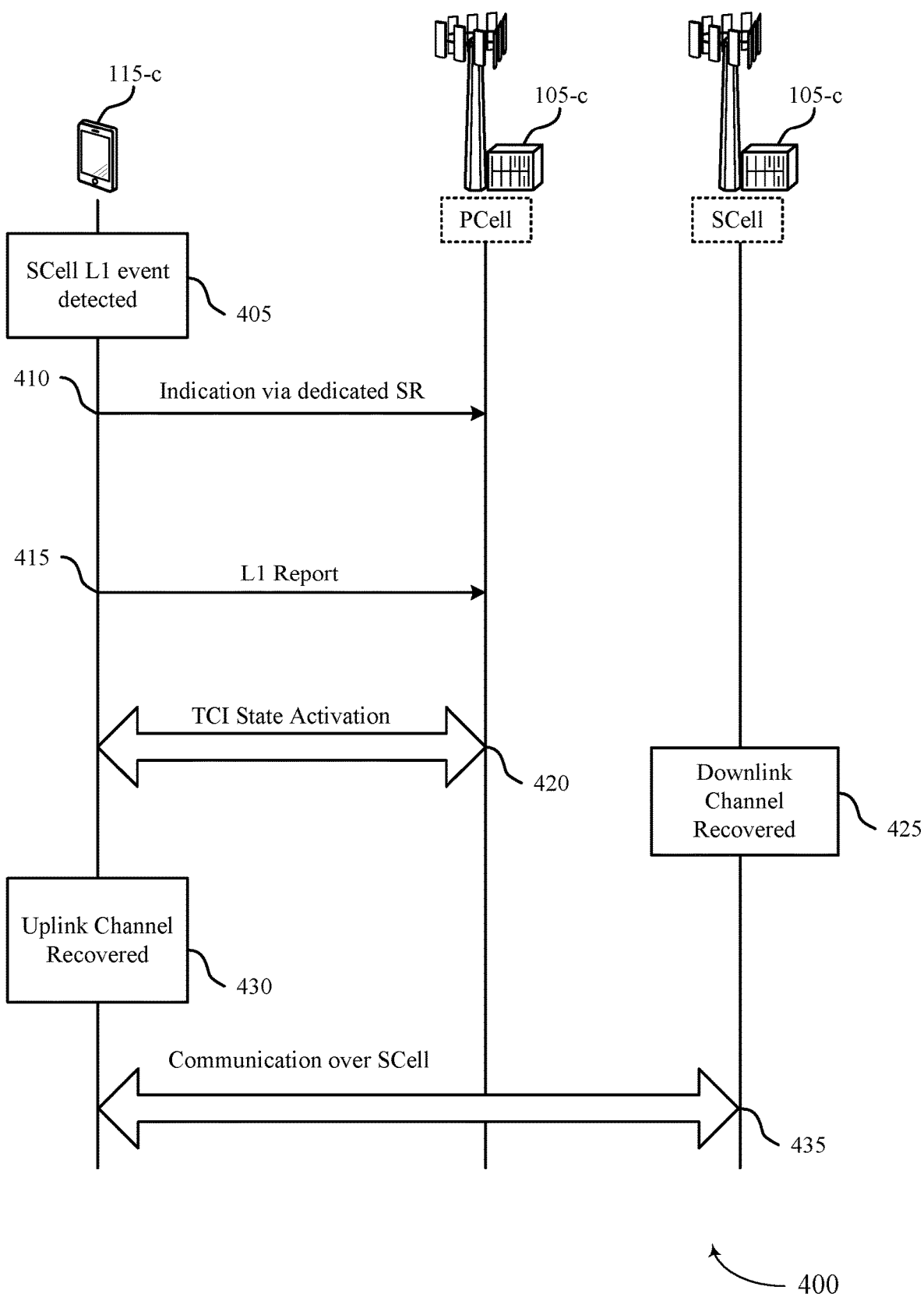

FIG. 4 illustrates an example of a process flow 400 that supports aspects of the present disclosure. In some examples, process flow 400 may implement aspects of wireless communications system 100.

At 405, UE 115-*c* may detect that a current downlink beam used for SCell communications with base station 105-*c* may be degrading or failing (e.g., based on a one or more L1 measurements of the current downlink beam).

At 410, UE 115-*c* may send an indication that the current downlink beam for SCell communications is failing to base station 105-*c*. The indication may include that one of the beams the UE 115-*c* is connected to for SCell communications may be failing, or that another L1 event has occurred. The indication may be transmitted from UE 115-*c* to base station 105-*c* over the PCell in a dedicated SR, which may be an SR configured for beam failure indications. The dedicated SR may be transmitted via a resource set of the PCell allocated for such an indication. In some cases, the dedicated SR may also include information regarding the number of attempts UE 115-*c* may have made to transmit the indication of the L1 event or a time duration associated with how long UE 115-*c* may wait for a response from base station 105-*c*. The transmission of the SR may be an example of a PUCCH-BFR. The time duration may be preconfigured by base station 105-*c*. In one example, the transmission of the indication from UE 115-*c* indicates to base station 105-*c* TCI reconfiguration is autonomous.

At 415, UE 115-*c* may transmit an L1 report to base station 105-*c* over the PCell, which may be transmitted via the PUCCH after a preset time following transmission of the indication at 410. The report may also be transmitted in a MAC-CE. The L1 report may include a selected beam for subsequent SCell communications based on measurements performed of candidate SCell beams. For example, base station 105-*c* may transmit one or more DLRSs over a set of beams of the SCell. The UE 115-*c* may monitor one or more of the set of beams and perform measurements to determine whether a beam is a candidate beam for subsequent SCell communications. The UE 115-*c* may determine whether a beam is a candidate beam based on a comparison of measured parameters (e.g., measured L1 characteristics) of the beam to corresponding parameters thresholds. Based on this comparison, the UE 115-*c* may determine a set of candidate beams or select a single beam for subsequent SCell communications (e.g., UE 115-*c* may select a beam with a highest RSRP or RSRQ).

Based on the L1 report, base station 105-*c* may activate a new TCI state to reconfigure its communication beam for SCell communications. Reconfiguration of the beam for SCell communications may occur after a time duration or a number of symbols following transmission of the L1 report at 415. At 420, the new TCI state may be activated. For instance, base station 105-*c* may indicate to the UE 115-*c* that it may switch to one of the candidate beams included in the L1 report or may switch to the beam identified in the L1 report.

At 425, the downlink channel (e.g., SCell beam) may be recovered by base station 105-*c* based on the TCI state activation at 420.

Based on the TCI activation, at 430 UE 115-*c* may reconfigure an uplink beam for SCell communications based on the selected beam included in the L1 report in order to recover the uplink channel. In some cases, the uplink beam for SCell communications may be recovered after a time duration or after a number of symbols after sending the L1 report (at 415) or after downlink channel recovery at 425.

At 435, UE 115-c may communicate over the SCell using the updated beam with base station 105-c.

Figure 5:
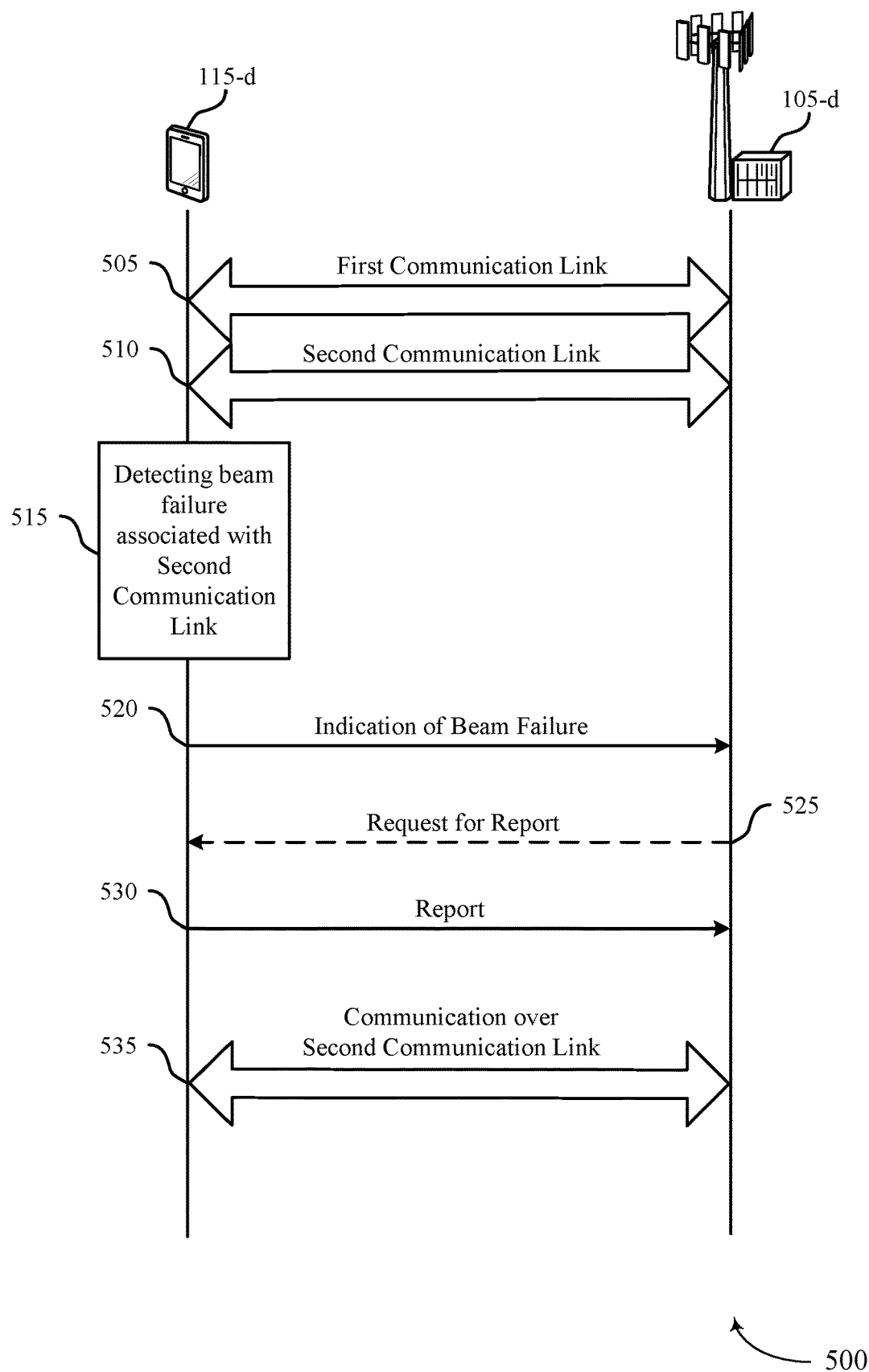

FIG. 5 illustrates an example of a process flow 500 that supports aspects of the present disclosure. In some examples, process flow 500 may implement aspects of wireless communications system 100. Process flow 500 may be implemented by a UE 115-d and a base station 105-d.

At 505, UE 115-d may establish a first communication link (e.g., a PCell) with which to communicate with base station 105-d.

At 510, UE 115-d may establish a second communication link (e.g., a PCell) with which to communicate with base station 105-d.

At 515, UE 115-d may detect a beam failure of a first beam associated with the second communication link. The first beam may be an example of a base station beam used for downlink communications. The beam failure may be detected based on an L1 event corresponding to an L1 characteristic of the first beam associated with the second communication link. For example, UE 115-d may monitor a DLRS from the base station via the second communication link using the first beam. UE 115-d may measure a parameter of the DLRS based on the monitoring. The beam failure of the first beam may be detected based on determining that the measure parameter crosses a threshold.

At 520, UE 115-d may transmit an indication of a first beam failure to base station 105-d. The indication of the beam failure of the first beam associated with the SCell may be transmitted via a dedicated SR channel of the first communication link (the PCell) where the dedicated SR channel is configured for indications of beam failures. In some examples, the indication of the beam failure of the first beam associated with the SCell may be transmitted in a standard SR message in which the UE 115-d requests uplink shared channel resources (e.g., PUSCH resources). In other examples, UE 115-d may transmit a set of SR messages according to an SR count limit or for a set time. In some cases, each SR message may include an indication of the beam failure. The SR transmission may be an example of a PUCCH-BFR.

Optionally, at 525, the base station 105-d may transmit a request for a report from the UE 115-d. The request may be transmitted via a PDCCH (e.g., a dedicated PDCCH in response to a dedicated SR message). In some cases, the request may include a grant for uplink shared channel resources (or a downlink grant for scheduling a downlink transmission from base station 105-d). UE 115-d may receive the request from base station 105-d within a time window after the transmission of the indication of the beam failure. The request may be associated with a DCI format for the downlink control channel.

At 530, UE 115-d may transmit the report to base station 105-d via the first communication link. The report may indicate a second beam for communicating via the second communication link. The report may be an example of an L1 report. The second beam may be an example of a candidate beam. The report may be transmitted by UE 115-b via the dedicated PUCCH or via the uplink shared channel resources indicated by an uplink grant from the base station. The report may be transmitted by UE 115-b after the expiration of a time duration following the transmission of the indication of the beam failure. The time duration may be associated with a number of symbols or a fixed time interval. In some cases, UE 115-d may transmit the report in absence of receiving a request for the report from base station 105-d, or may be in response to the optionally transmitted request at 525.

At 535, UE 115-d and base station 105-d may communicate over the second communication link. The communication over the second communication link may be based on updating the downlink beams for the second communication link according to the second beam indicated in the report. In some examples, UE 115-d may update an uplink beam for the second communication link for UE 115-d after the expiration of a time interval following the update of the downlink beam. The uplink beam may be associated with at least one of a PUSCH or a PUCCH. The uplink beam may be updated based on antenna weights that may be associated with the updated downlink beam.

Figure 6:
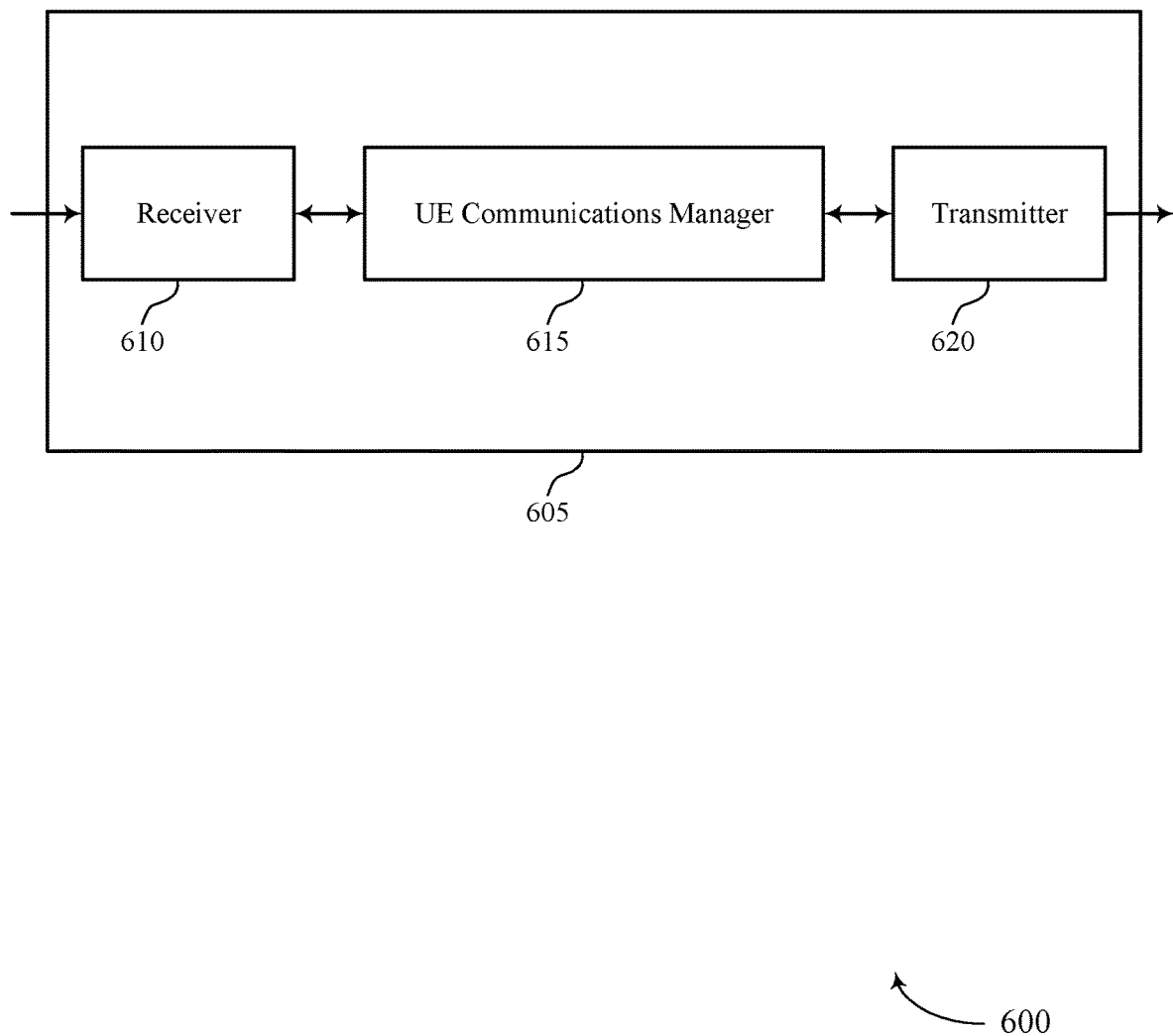
FIGS. 6 and 7 show block diagrams of devices that support aspects of the present disclosure.

FIG. 6 shows a block diagram 600 of a device 605 that supports aspects of the present disclosure. The device 605 may be an example of aspects of a UE as described herein. The device 605 may include a receiver 610, a UE communications manager 615, and a transmitter 620. The device 605 may also include a processor. Each of these components may be in communication with one another (e.g., via one or more buses).

The receiver 610 may receive information such as packets, user data, or control information associated with various information channels (e.g., control channels, data channels, and information related to autonomous transmission configuration updating, etc.). Information may be passed on to other components of the device 605. The receiver 610 may be an example of aspects of the transceiver 920 described with reference to FIG. 9. The receiver 610 may utilize a single antenna or a multiple antennas.

The UE communications manager 615 may establish a first communication link and a second communication link with a base station, detect a beam failure of a first beam associated with the second communication link, transmit, to the base station via the first communication link, an indication of the beam failure of the first beam associated with the second communication link, transmit, to the base station via the first communication link, a report indicating a second beam for communicating via the second communication link, and communicate with the base station via the second communication link using the second beam. The UE communications manager 615 may be an example of aspects of the UE communications manager 910 described herein.

The UE communications manager 615, or its sub-components, may be implemented to realize one or more potential advantages. One implementation may allow the device 605 to save power and increase battery life by communicating with a base station 105 (as shown in FIG. 1) more efficiently. For example, the device 605 may support autonomous transmission configuration updating and provide for more efficient beam failure recovery. Additionally, or alternatively, autonomous TCI state updating may reduce latency at the device 605, which may allow for more efficient communications. The UE communications manager 615 may be an example of aspects of the UE communications manager 910.

The UE communications manager 615, or its sub-components, may be implemented in hardware, code (e.g., software or firmware) executed by a processor, or any combination thereof. If implemented in code executed by a processor, the functions of the UE communications manager 615, or its sub-components may be executed by a general-purpose processor, a digital signal processor (DSP), a central processing unit (CPU), an application-specific integrated circuit (ASIC), a field-programmable gate array (FPGA) or other programmable logic device, discrete gate or transistor logic, discrete hardware components, or any combination thereof designed to perform the functions described in the present disclosure.

The UE communications manager 615, or its sub-components, may be physically located at various positions, including being distributed such that portions of functions are implemented at different physical locations by one or more physical components. In some examples, the UE communications manager 615, or its sub-components, may be a separate and distinct component in accordance with various aspects of the present disclosure. In some examples, the UE communications manager 615, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 620 may transmit signals generated by other components of the device 605. In some examples, the transmitter 620 may be collocated with a receiver 610 in a transceiver module. For example, the transmitter 620 may be an example of aspects of the transceiver 920 described with reference to FIG. 9. The transmitter 620 may utilize a single antenna or a multiple antennas.

Figure 7:
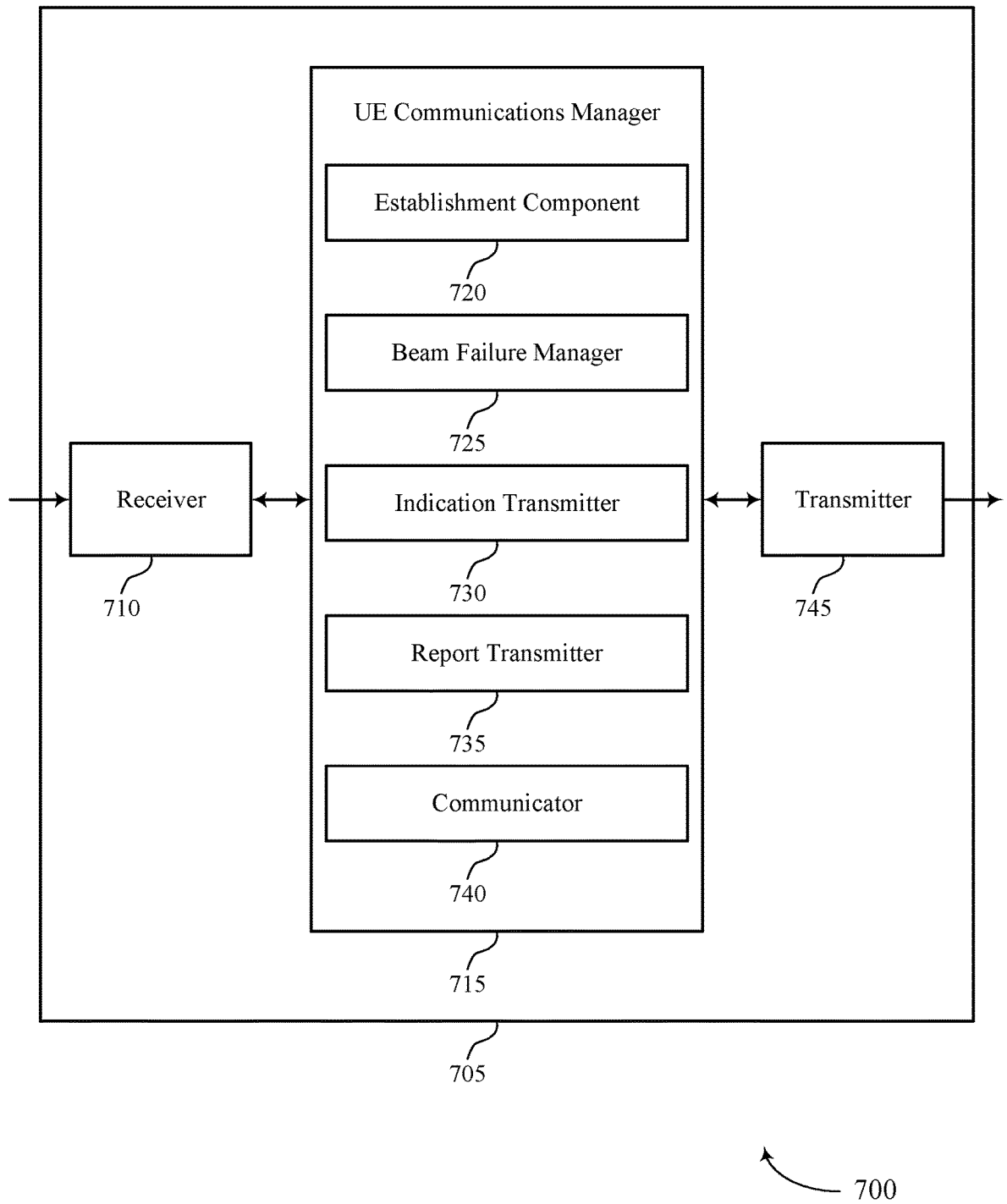

FIG. 7 shows a block diagram 700 of a device 705 that supports aspects of the present disclosure. The device 705 may be an example of aspects of a device 605, or a UE as described herein. The device 705 may include a receiver 710, a UE communications manager 715, and a transmitter 745. The device 705 may also include a processor. Each of these components may be in communication with one another (e.g., via one or more buses).

The receiver 710 may receive information such as packets, user data, or control information associated with various information channels (e.g., control channels, data channels, and information related to autonomous transmission configuration updating, etc.). Information may be passed on to other components of the device 705. The receiver 710 may be an example of aspects of the transceiver 920 described with reference to FIG. 9. The receiver 710 may utilize a single antenna or multiple antennas.

The UE communications manager 715 may be an example of aspects of the UE communications manager 615 as described herein. The UE communications manager 715 may include an establishment component 720, a beam failure manager 725, an indication transmitter 730, a report transmitter 735, and a communicator 740. The UE communications manager 715 may be an example of aspects of the UE communications manager 910 described herein.

The establishment component 720 may establish a first communication link and a second communication link with a base station.

The beam failure manager 725 may detect a beam failure of a first beam associated with the second communication link.

The indication transmitter 730 may transmit, to the base station via the first communication link, an indication of the beam failure of the first beam associated with the second communication link.

The report transmitter 735 may transmit, to the base station via the first communication link, a report indicating a second beam for communicating via the second communication link.

The communicator 740 may communicate with the base station via the second communication link using the second beam.

The transmitter 745 may transmit signals generated by other components of the device 705. In some examples, the transmitter 745 may be collocated with a receiver 710 in a transceiver module. For example, the transmitter 745 may be an example of aspects of the transceiver 920 described with reference to FIG. 9. The transmitter 745 may utilize a single antenna or multiple antennas.

Figure 8:
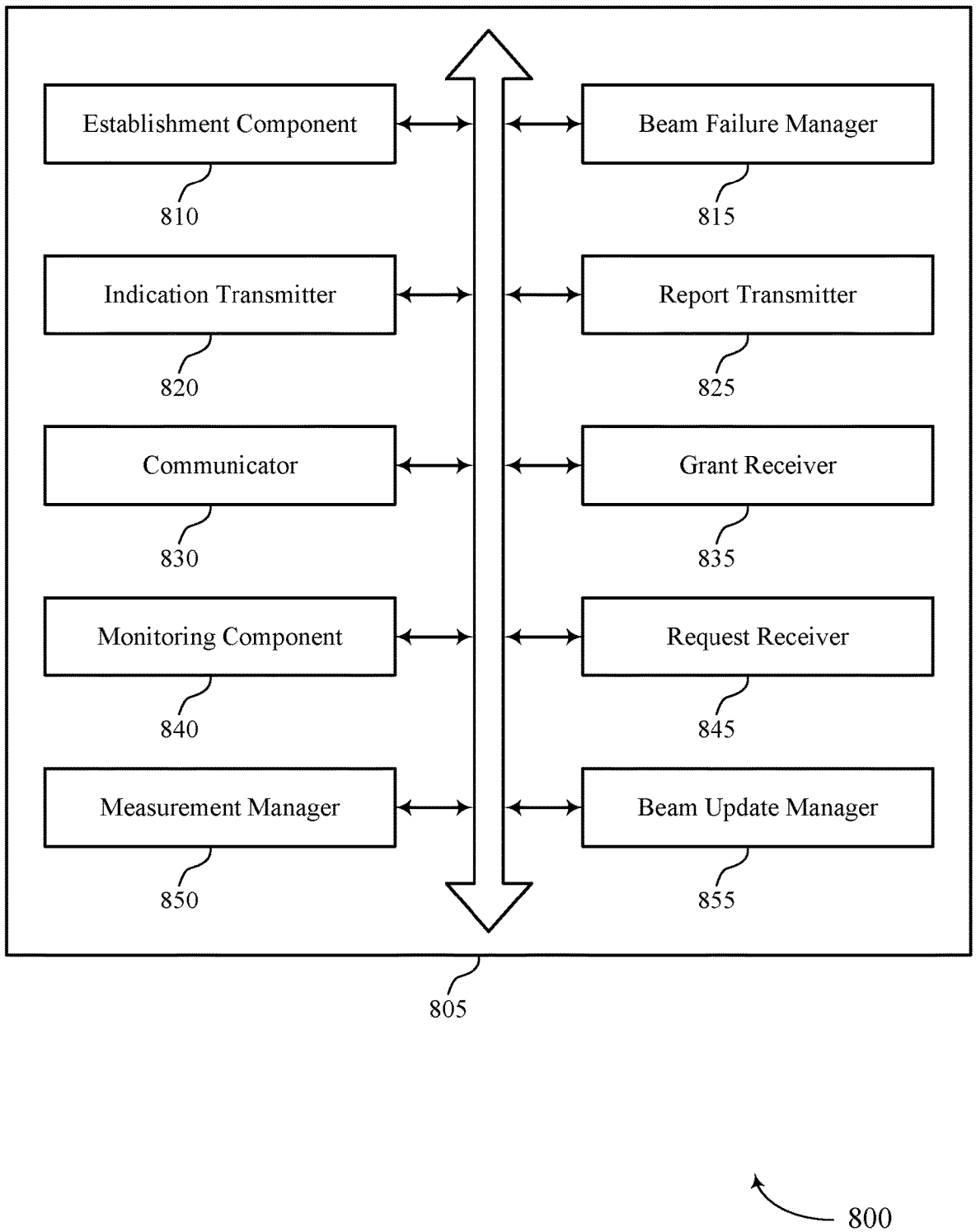
FIG. 8 shows a block diagram of a communications manager that supports aspects of the present disclosure.

FIG. 8 shows a block diagram 800 of a UE communications manager 805 that supports aspects of the present disclosure. The UE communications manager 805 may be an example of aspects of a UE communications manager 615, a UE communications manager 715, or a UE communications manager 910 described herein. The UE communications manager 805 may include an establishment component 810, a beam failure manager 815, an indication transmitter 820, a report transmitter 825, a communicator 830, a grant receiver 835, a monitoring component 840, a request receiver 845, a measurement manager 850, and a beam update manager 855. Each of these modules may communicate, directly or indirectly, with one another (e.g., via one or more buses).

The establishment component 810 may establish a first communication link and a second communication link with a base station.

The beam failure manager 815 may detect a beam failure of a first beam associated with the second communication link.

The indication transmitter 820 may transmit, to the base station via the first communication link, an indication of the beam failure of the first beam associated with the second communication link. In some examples, the indication transmitter 820 may transmit the indication of the beam failure of the first beam in a dedicated SR message via the first communication link, the dedicated SR message configured for indications of beam failures. In some cases, the indication transmitter 820 may transmit the indication of the beam failure of the first beam in an SR message via a PUCCH. In some aspects, the indication transmitter 820 may transmit one or more additional SR messages based on an absence of a response to the SR message from the base station, the one or more additional SR messages transmitted according to an SR count limit or a time duration associated with SR messages. In some instances, the indication transmitter 820 may transmit the indication of the beam failure of the first beam in a dedicated SR message.

The report transmitter 825 may transmit, to the base station via the first communication link, a report indicating a second beam for communicating via the second communication link. In some examples, the report transmitter 825 may transmit the report using the uplink shared channel resources indicated by the grant. In some cases, the report transmitter 825 may transmit the report via the PUCCH after transmission of the indication of the beam failure. In some aspects, the report transmitter 825 may transmit the report after expiration of a time duration following transmission of the indication of the beam failure, the time duration associated with a number of symbols or a fixed time interval. In some instances, the report transmitter 825 may transmit the report in response to the request. In some examples, report transmitter 825 may transmit the report via the uplink shared channel resources for the UE indicated by the grant. In some aspects, the report transmitter 825 may transmit the report via a PUCCH in response to the request. In some cases, the report is transmitted in an absence of receiving a request for the report.

The communicator 830 may communicate with the base station via the second communication link using the second beam.

The grant receiver 835 may receive a grant for uplink shared channel resources from the base station in response to the SR message.

The monitoring component 840 may monitor for a response from the base station based on the SR message. In some examples, the monitoring component 840 may monitor a downlink reference signal from the base station via the second communication link using the first beam. In some cases, the monitoring component 840 may monitor a downlink reference signal from the base station via the second communication link using the second beam of a set of beams.

The request receiver 845 may receive, from the base station, a request for the report via a downlink control channel. In some examples, receiving the request via a PDCCH or a dedicated PDCCH, where the request includes a grant for uplink shared channel resources for the UE. In some cases, the request receiver 845 may receive the request for the report from the base station in response to the dedicated SR message. In some aspects, the request receiver 845 may receive the request within a time window after transmission of the indication of the beam failure. In some instances, the request is associated with a DCI format for the downlink control channel.

The measurement manager 850 may measure a parameter of the downlink reference signal based on the monitoring, where beam failure of the first beam is detected based on determining that the measured parameter crosses a threshold. In some examples, the measurement manager 850 may determine that the second beam is preferred over the first beam for communicating via the second communication link based on the monitoring.

The beam update manager 855 may update a downlink beam for the second communication link according to the second beam. In some examples, the beam update manager 855 may update an uplink beam for the second communication link for the UE after expiration of a time interval following the update of the downlink beam. In some cases, the uplink beam is associated with at least one of a PUSCH or a PUCCH. In some aspects, the uplink beam is updated based on antenna weights associated with the updated downlink beam.

Figure 9:
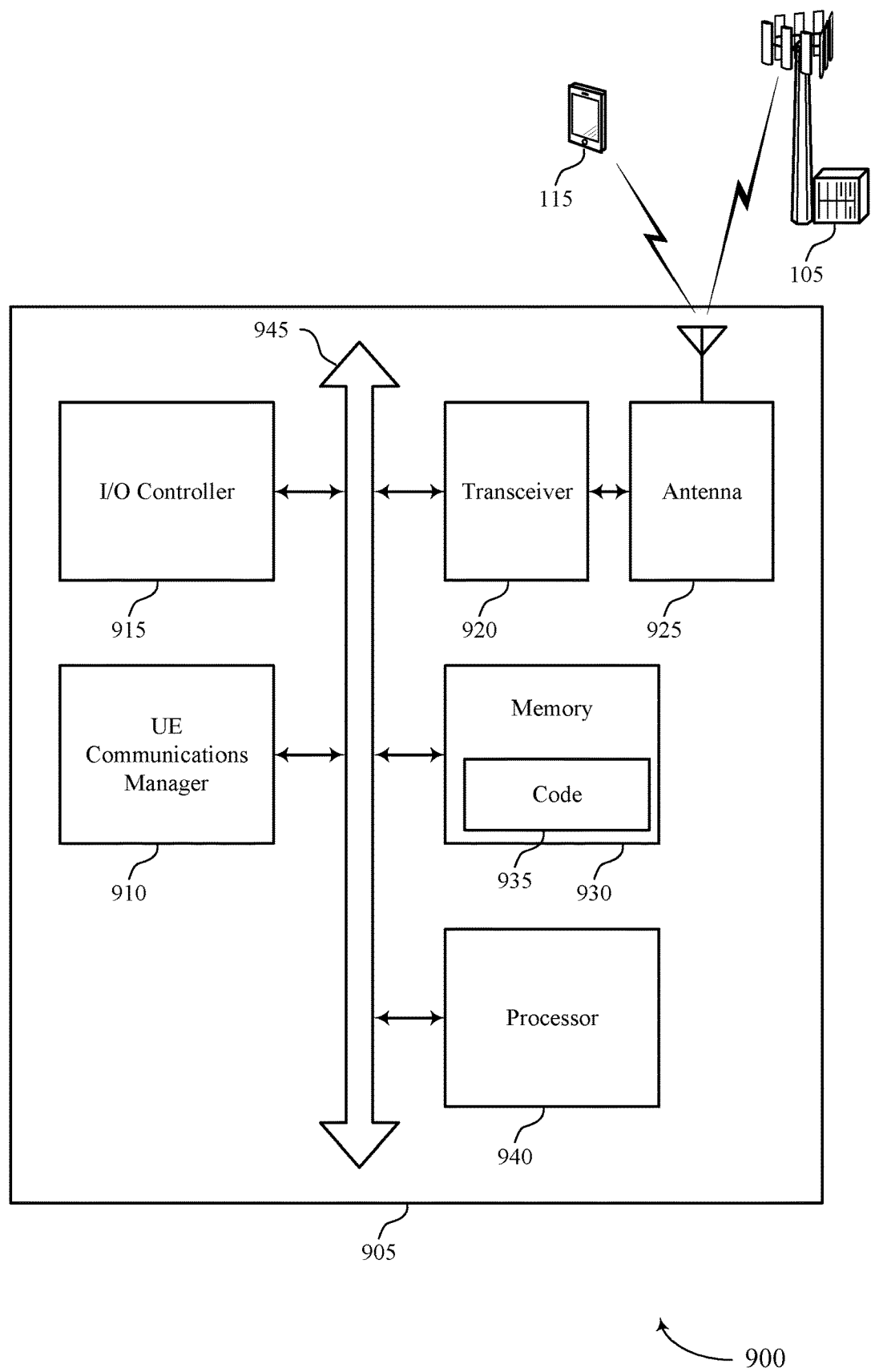
FIG. 9 shows a diagram of a system including a device that supports aspects of the present disclosure.

FIG. 9 shows a diagram of a system 900 including a device 905 that supports aspects of the present disclosure. The device 905 may be an example of or include the components of device 605, device 705, or a UE as described herein. The device 905 may include components for bi-directional voice and data communications including components for transmitting and receiving communications, including a UE communications manager 910, an I/O controller 915, a transceiver 920, an antenna 925, memory 930, and a processor 940. These components may be coupled via one or more buses (e.g., bus 945).

The UE communications manager 910 may establish a first communication link and a second communication link with a base station and detect a beam failure of a first beam associated with the second communication link. The UE communications manager 910 may transmit, to the base station via the first communication link, an indication of the beam failure of the first beam associated with the second communication link and transmit, to the base station via the first communication link, a report indicating a second beam for communicating via the second communication link, and communicate with the base station via the second communication link using the second beam.

The I/O controller 915 may manage input and output signals for the device 905. The I/O controller 915 may also manage peripherals not integrated into the device 905. In some cases, the I/O controller 915 may represent a physical connection or port to an external peripheral. In some cases, the I/O controller 915 may utilize an operating system such as iOS®, ANDROID®, MS-DOS®, MS-WINDOWS®, OS/2®, UNIX®, LINUX®, or another known operating system. In other cases, the I/O controller 915 may represent or interact with a modem, a keyboard, a mouse, a touchscreen, or a similar device. In some cases, the I/O controller 915 may be implemented as part of a processor. In some aspects, a user may interact with the device 905 via the I/O controller 915 or via hardware components controlled by the I/O controller 915.

The transceiver 920 may communicate bi-directionally, via one or more antenna(s) 925, wired, or wireless links as described herein. For example, the transceiver 920 may represent a wireless transceiver and may communicate bi-directionally with another wireless transceiver. The transceiver 920 may also include a modem to modulate the packets and provide the modulated packets to the antennas for transmission, and to demodulate packets received from the antenna(s) 925.

In some cases, the device 905 may include a single antenna 925, or may include more than one antenna 925, which may be capable of concurrently transmitting or receiving multiple wireless transmissions.

The memory 930 may include random access memory (RAM) and read only memory (ROM). The memory 930 may store computer-readable, computer-executable code 935 including instructions that, when executed, cause the processor to perform various functions described herein. In some cases, the memory 930 may contain, among other things, a basic I/O system (BIOS) which may control basic hardware or software operation such as the interaction with peripheral components or devices.

The processor 940 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 940 may be configured to operate a memory array using a memory controller. In other cases, a memory controller may be integrated into the processor 940. The processor 940 may be configured to execute computer-readable instructions stored in a memory (e.g., the memory 930) to cause the device 905 to perform various functions (e.g., functions or tasks supporting autonomous transmission configuration updating).

The processor 940 of the device 900 (e.g., a general-purpose processor, a DSP, a CPU, a microcontroller, an ASIC, an FPGA, a programmable logic device, a discrete gate or transistor logic component, a discrete hardware component, or any combination thereof) may reduce power consumption and increase packet processing efficiency based on more efficient beam failure recovery. For example, the processor 940 of the device 905 may turn on one or more processing units for processing the data transmission, increase a processing clock, or a similar mechanism within the device 905. As such, if a downlink beam used for communication degrades or fails, a UE may transmit an indication of the degradation or failure. After receiving the indication, a base station may request an uplink report from the UE or alternatively, may monitor a set of resources for the uplink report without transmitting a request to the UE. The improvements in power saving and data transmission processing efficiency may further increase battery life at the device 905 (e.g., by reducing or eliminating unnecessary or failed data transmissions, etc.).

The code 935 may include instructions to implement aspects of the present disclosure, including instructions to support wireless communications. The code 935 may be stored in a non-transitory computer-readable medium such as system memory, memory 930, or other type of memory. In some cases, the code 935 may not be directly executable by the processor 940 but may cause a computer (e.g., when compiled and executed) to perform functions described herein.

Figure 10:
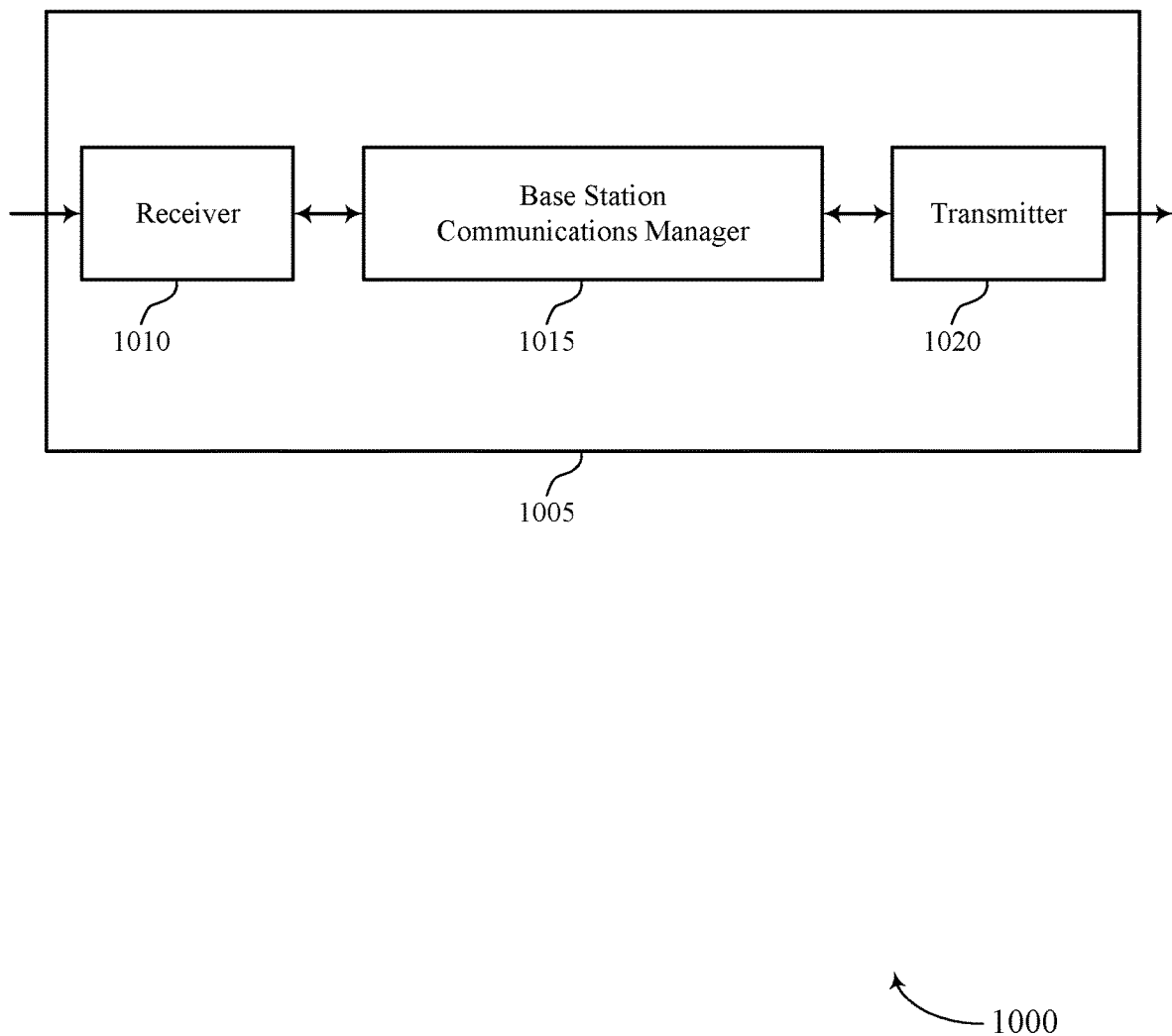
FIGS. 10 and 11 show block diagrams of devices that support aspects of the present disclosure.

FIG. 10 shows a block diagram 1000 of a device 1005 that supports aspects of the present disclosure. The device 1005 may be an example of aspects of a base station as described herein. The device 1005 may include a receiver 1010, a base station communications manager 1015, and a transmitter 1020. The device 1005 may also include a processor. Each of these components may be in communication with one another (e.g., via one or more buses).

The receiver 1010 may receive information such as packets, user data, or control information associated with various information channels (e.g., control channels, data channels, and information related to autonomous transmission configuration updating, etc.). Information may be passed on to other components of the device 1005. The receiver 1010 may be an example of aspects of the transceiver 1320 described with reference to FIG. 13. The receiver 1010 may utilize a single antenna or multiple antennas.

The base station communications manager 1015 may establish a first communication link and a second communication link with a UE and receive, from the UE via the first communication link, an indication of a beam failure of a first beam associated with the second communication link. The base station communications manager 1015 receive, from the UE via the first communication link, a report indicating a second beam for communicating with the UE via the second communication link, and communicate with the UE via the second communication link using the second beam. The base station communications manager 1015 may be an example of aspects of the base station communications manager 1310 described herein.

The base station communications manager 1015, or its sub-components, may be implemented in hardware, code (e.g., software or firmware) executed by a processor, or any combination thereof. If implemented in code executed by a processor, the functions of the base station communications manager 1015, or its sub-components may be executed by a general-purpose processor, a DSP, a CPU, an ASIC, an FPGA or other programmable logic device, discrete gate or transistor logic, discrete hardware components, or any combination thereof designed to perform the functions described in the present disclosure.

The base station communications manager 1015, or its sub-components, may be physically located at various positions, including being distributed such that portions of functions are implemented at different physical locations by one or more physical components. In some examples, the base station communications manager 1015, or its sub-components, may be a separate and distinct component in accordance with various aspects of the present disclosure. In some examples, the base station communications manager 1015, or its sub-components, may be combined with one or more other hardware components, including but not limited to an I/O component, a transceiver, a network server, another computing device, one or more other components described in the present disclosure, or a combination thereof in accordance with various aspects of the present disclosure.

The transmitter 1020 may transmit signals generated by other components of the device 1005. In some examples, the transmitter 1020 may be collocated with a receiver 1010 in a transceiver module. For example, the transmitter 1020 may be an example of aspects of the transceiver 1320 described with reference to FIG. 13. The transmitter 1020 may utilize a single antenna or multiple antennas.

Figure 11:
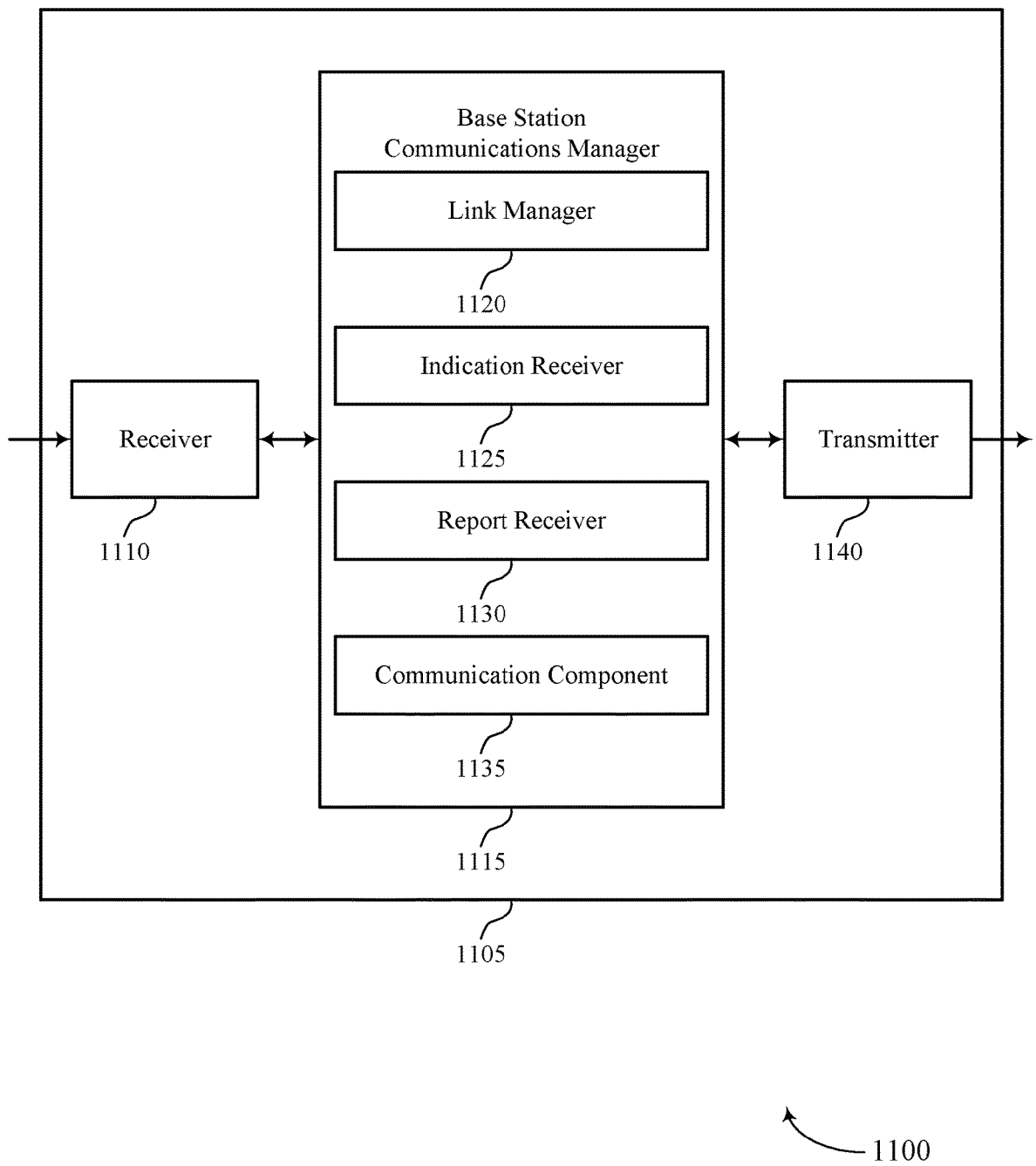

FIG. 11 shows a block diagram 1100 of a device 1105 that supports aspects of the present disclosure. The device 1105 may be an example of aspects of a device 1005, or a base station as described herein. The device 1105 may include a receiver 1110, a base station communications manager 1115, and a transmitter 1140. The device 1105 may also include a processor. Each of these components may be in communication with one another (e.g., via one or more buses).

The receiver 1110 may receive information such as packets, user data, or control information associated with various information channels (e.g., control channels, data channels, and information related to autonomous transmission configuration updating, etc.). Information may be passed on to other components of the device 1105. The receiver 1110 may be an example of aspects of the transceiver 1320 described with reference to FIG. 13. The receiver 1110 may utilize a single antenna or multiple antennas.

The base station communications manager 1115 may be an example of aspects of the base station communications manager 1015 as described herein. The base station communications manager 1115 may include a link manager 1120, an indication receiver 1125, a report receiver 1130, and a base station communication component 1135. The base station communications manager 1115 may be an example of aspects of the base station communications manager 1310 described herein.

The link manager 1120 may establish a first communication link and a second communication link with a UE.

The indication receiver 1125 may receive, from the UE via the first communication link, an indication of a beam failure of a first beam associated with the second communication link.

The report receiver 1130 may receive, from the UE via the first communication link, a report indicating a second beam for communicating with the UE via the second communication link.

The communication component 1135 may communicate with the UE via the second communication link using the second beam.

The transmitter 1140 may transmit signals generated by other components of the device 1105. In some examples, the transmitter 1140 may be collocated with a receiver 1110 in a transceiver module. For example, the transmitter 1140 may be an example of aspects of the transceiver 1320 described with reference to FIG. 13. The transmitter 1140 may utilize a single antenna or multiple antennas.

Figure 12:
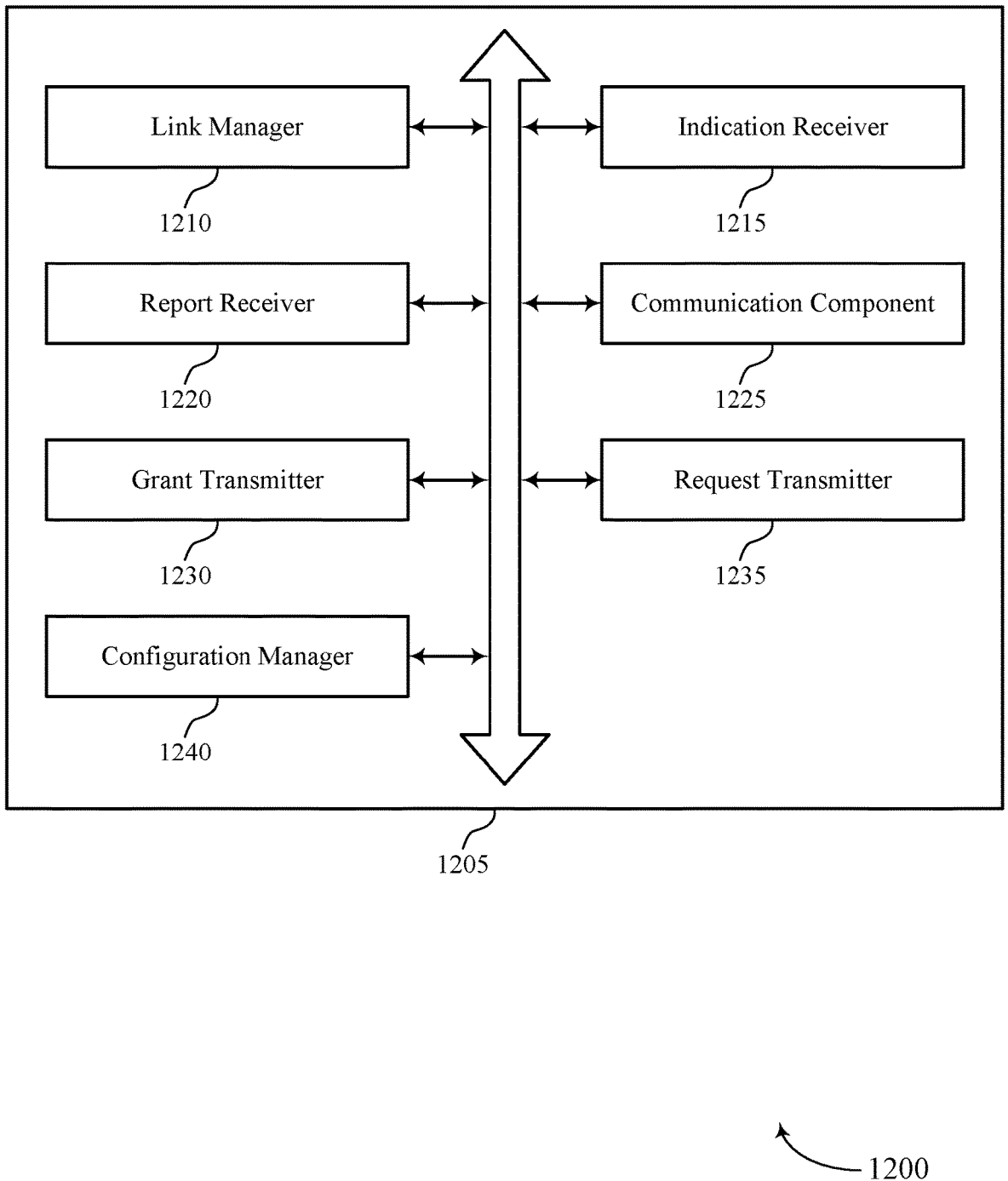
FIG. 12 shows a block diagram of a communications manager that supports aspects of the present disclosure.

FIG. 12 shows a block diagram 1200 of a base station communications manager 1205 that supports aspects of the present disclosure. The base station communications manager 1205 may be an example of aspects of a base station communications manager 1015, a base station communications manager 1115, or a base station communications manager 1310 described herein. The base station communications manager 1205 may include a link manager 1210, an indication receiver 1215, a report receiver 1220, a communication component 1225, a grant transmitter 1230, a request transmitter 1235, and a configuration manager 1240. Each of these modules may communicate, directly or indirectly, with one another (e.g., via one or more buses).

The link manager 1210 may establish a first communication link and a second communication link with a UE.

The indication receiver 1215 may receive, from the UE via the first communication link, an indication of a beam failure of a first beam associated with the second communication link. In some examples, the indication receiver 1215 may receive the indication of the beam failure of the first beam in a dedicated SR message via the first communication link, the dedicated SR message configured for indications of beam failures. In some cases, the indication receiver 1215 may receive the indication of the beam failure of the first beam in an SR message via a PUCCH. In some aspects, the indication receiver 1215 may receive the indication of the beam failure of the first beam in a dedicated SR message.

The report receiver 1220 may receive, from the UE via the first communication link, a report indicating a second beam for communicating with the UE via the second communication link. In some examples, the report receiver 1220 may receive the report via the uplink shared channel resources indicated by the grant. In some cases, the report receiver 1220 may receive the report via the PUCCH after transmission of the indication of the beam failure. In some aspects, the report receiver 1220 may receive the report after expiration of a time duration following receipt of the indication of the beam failure, the time duration associated with a number of symbols or a fixed time interval. In some instances, the report receiver 1220 may receive the report via the uplink shared channel resources for the UE indicated by the grant. In some examples, the report receiver 1220 may receive the report via a PUCCH in response to the request.

The communication component 1225 may communicate with the UE via the second communication link using the second beam.

The grant transmitter 1230 may transmit a grant for uplink shared channel resources to the UE in response to the SR message.

The request transmitter 1235 may transmit, to the UE, a request for the report via a downlink control channel, where the report is received in response to the request. In some examples, transmitting the request via a PDCCH or a dedicated PDCCH, where the request includes a grant for uplink shared channel resources for the UE. In some cases, the request transmitter 1235 may transmit the request for the report to the UE in response to the dedicated SR message. In some aspects, the request transmitter 1235 may transmit the request within a time window after receipt of the indication of the beam failure. In some instances, the request is associated with a DCI format for the downlink control channel.

The configuration manager 1240 may modify a transmission configuration for a downlink beam for the second communication link according to the second beam. The modified transmission configuration may an autonomously activated transmission configuration indicator (TCI) state, which may be based on a report indicating the second beam for communicating with the UE via the second communication link. In some cases, the report explicitly indicates that the second beam is preferred. Additionally, or alternatively, the report includes beam characteristics for at least the second beam.

Figure 13:
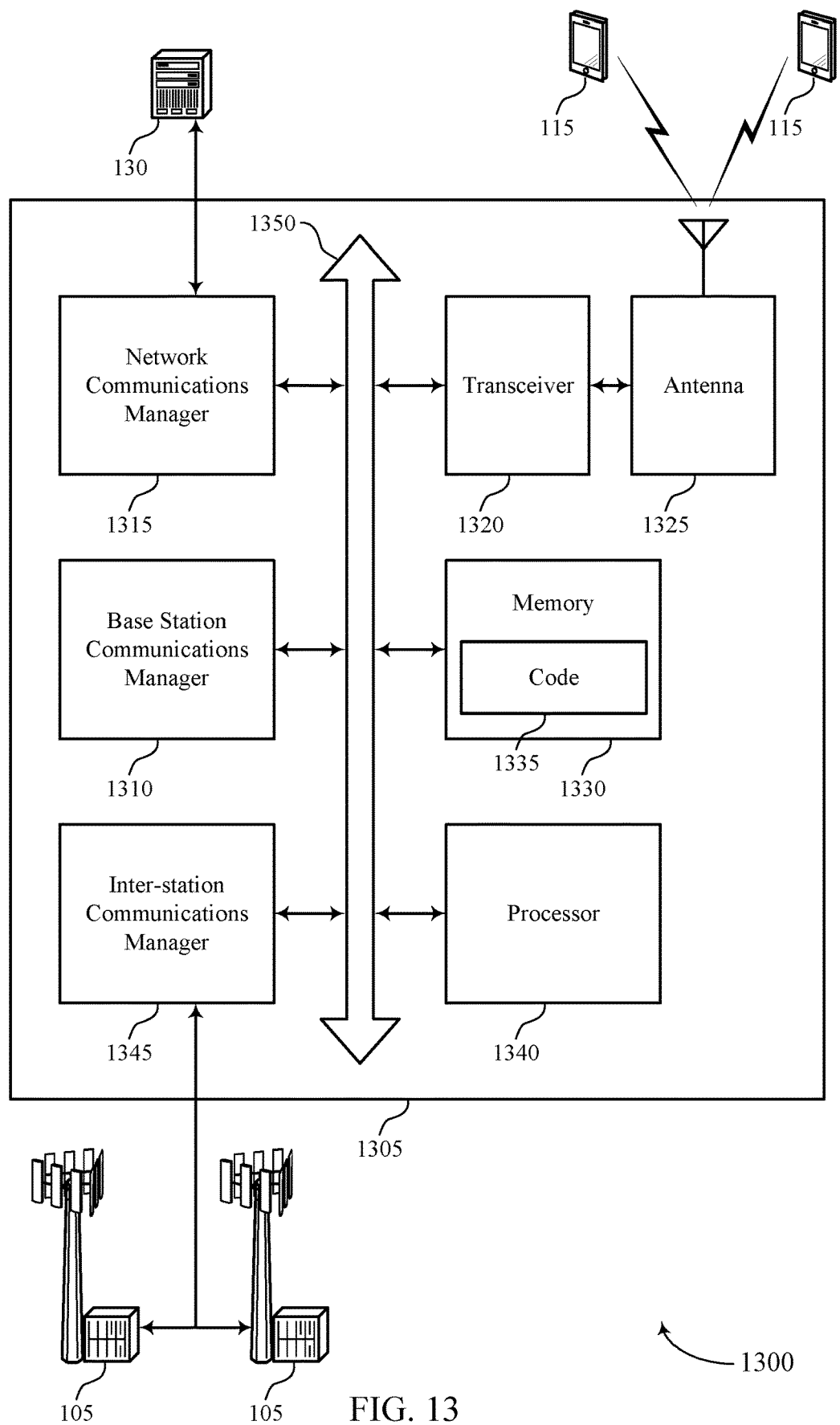
FIG. 13 shows a diagram of a system including a device that supports aspects of the present disclosure.

FIG. 13 shows a diagram of a system 1300 including a device 1305 that supports aspects of the present disclosure.

The device 1305 may be an example of or include the components of device 1005, device 1105, or a base station as described herein. The device 1305 may include components for bi-directional voice and data communications including components for transmitting and receiving communications, including a base station communications manager 1310, a network communications manager 1315, a transceiver 1320, an antenna 1325, memory 1330, a processor 1340, and an inter-station communications manager 1345. These components may be coupled via one or more buses (e.g., bus 1350).

The base station communications manager 1310 may establish a first communication link and a second communication link with a UE, and receive, from the UE via the first communication link, an indication of a beam failure of a first beam associated with the second communication link. The base station communications manager 1310 may receive, from the UE via the first communication link, a report indicating a second beam for communicating with the UE via the second communication link, and communicate with the UE via the second communication link using the second beam.

The network communications manager 1315 may manage communications with the core network (e.g., via one or more wired backhaul links). For example, the network communications manager 1315 may manage the transfer of data communications for client devices, such as one or more UEs 115.

The transceiver 1320 may communicate bi-directionally, via one or more antenna(s) 1325, wired, or wireless links as described herein. For example, the transceiver 1320 may represent a wireless transceiver and may communicate bi-directionally with another wireless transceiver. The transceiver 1320 may also include a modem to modulate the packets and provide the modulated packets to the antennas for transmission, and to demodulate packets received from the antenna(s) 1325.

In some cases, the device 1305 may include a single antenna 1325, or may include more than one antenna 1325, which may be capable of concurrently transmitting or receiving multiple wireless transmissions.

The memory 1330 may include RAM, ROM, or a combination thereof. The memory 1330 may store computer-readable code 1335 including instructions that, when executed by a processor (e.g., the processor 1340) cause the device to perform various functions described herein. In some cases, the memory 1330 may contain, among other things, a BIOS which may control basic hardware or software operation such as the interaction with peripheral components or devices.

The processor 1340 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1340 may be configured to operate a memory array using a memory controller. In some cases, a memory controller may be integrated into processor 1340. The processor 1340 may be configured to execute computer-readable instructions stored in a memory (e.g., the memory 1330) to cause the device 1305 to perform various functions (e.g., functions or tasks supporting autonomous transmission configuration updating).

The inter-station communications manager 1345 may manage communications with other base station 105, and may include a controller or scheduler for controlling communications with UEs 115 in cooperation with other base stations 105. For example, the inter-station communications manager 1345 may coordinate scheduling for transmissions to UEs 115 for various interference mitigation techniques such as beamforming or joint transmission. In some examples, the inter-station communications manager 1345 may provide an X2 interface within an LTE/LTE-A wireless communication network technology to provide communication between base stations 105.

The code 1335 may include instructions to implement aspects of the present disclosure, including instructions to support wireless communications. The code 1335 may be stored in a non-transitory computer-readable medium such as system memory, memory 1330, or other type of memory. In some cases, the code 1335 may not be directly executable by the processor 1340 but may cause a computer (e.g., when compiled and executed) to perform functions described herein.

Figure 14:
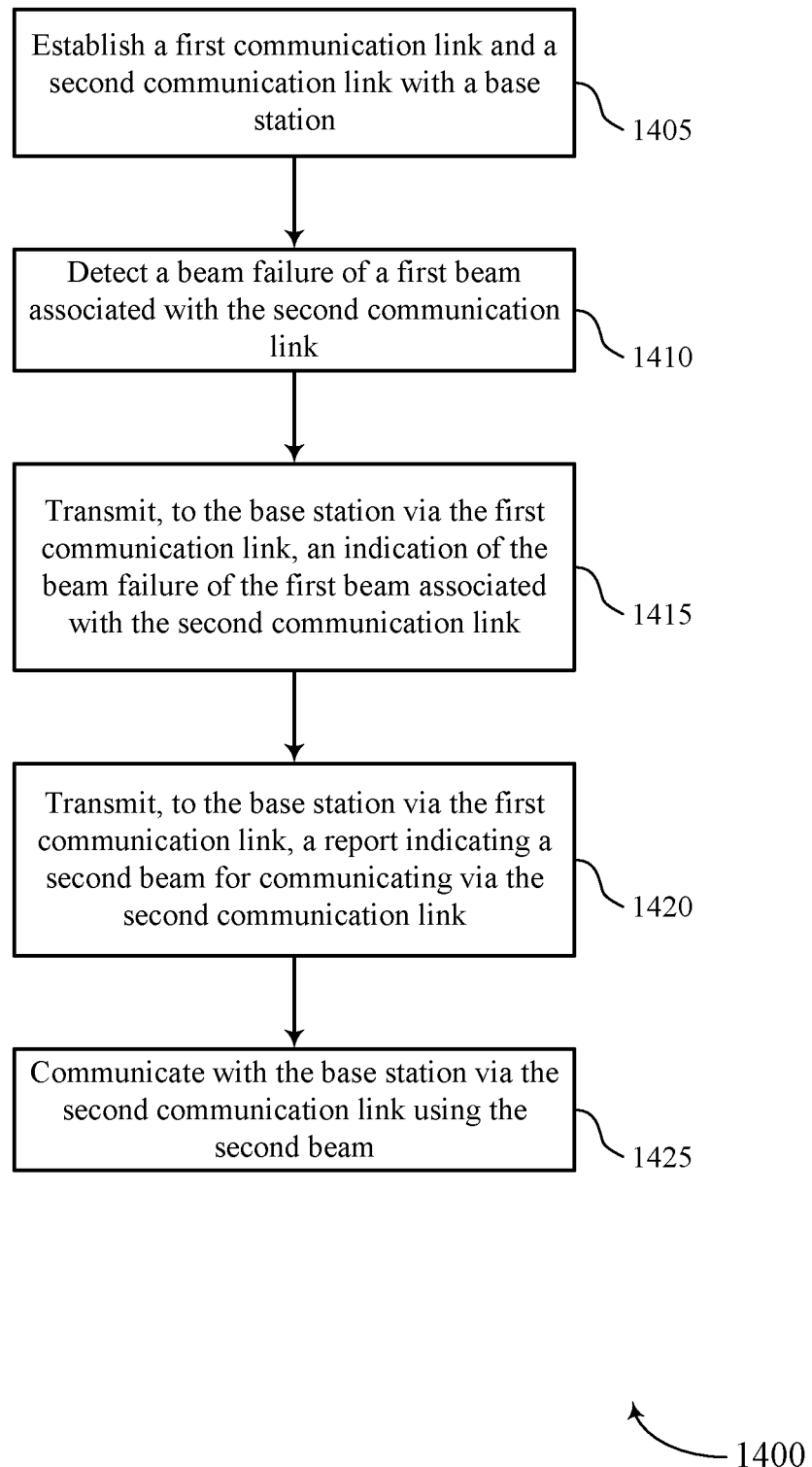
FIGS. 14 through 20 show flowcharts illustrating methods that support aspects of the present disclosure.

FIG. 14 shows a flowchart illustrating a method 1400 that supports aspects of the present disclosure. The operations of method 1400 may be implemented by a UE or its components as described herein. For example, the operations of method 1400 may be performed by a UE communications manager as described with reference to FIGS. 6 through 9. In some examples, a UE may execute a set of instructions to control the functional elements of the UE to perform the functions described herein. Additionally or alternatively, a UE may perform aspects of the functions described herein using special-purpose hardware.

At 1405, the UE may establish a first communication link and a second communication link with a base station. The operations of 1405 may be performed according to the methods described herein. In some examples, aspects of the operations of 1405 may be performed by an establishment component as described with reference to FIGS. 6 through 9.

At 1410, the UE may detect a beam failure of a first beam associated with the second communication link. The operations of 1410 may be performed according to the methods described herein. In some examples, aspects of the operations of 1410 may be performed by a beam failure manager as described with reference to FIGS. 6 through 9.

At 1415, the UE may transmit, to the base station via the first communication link, an indication of the beam failure of the first beam associated with the second communication link. The operations of 1415 may be performed according to the methods described herein. In some examples, aspects of the operations of 1415 may be performed by an indication transmitter as described with reference to FIGS. 6 through 9.

At 1420, the UE may transmit, to the base station via the first communication link, a report indicating a second beam for communicating via the second communication link. The operations of 1420 may be performed according to the methods described herein. In some examples, aspects of the operations of 1420 may be performed by a report transmitter as described with reference to FIGS. 6 through 9.

At 1425, the UE may communicate with the base station via the second communication link using the second beam. The operations of 1425 may be performed according to the methods described herein. In some examples, aspects of the operations of 1425 may be performed by a communicator as described with reference to FIGS. 6 through 9.

Figure 15:
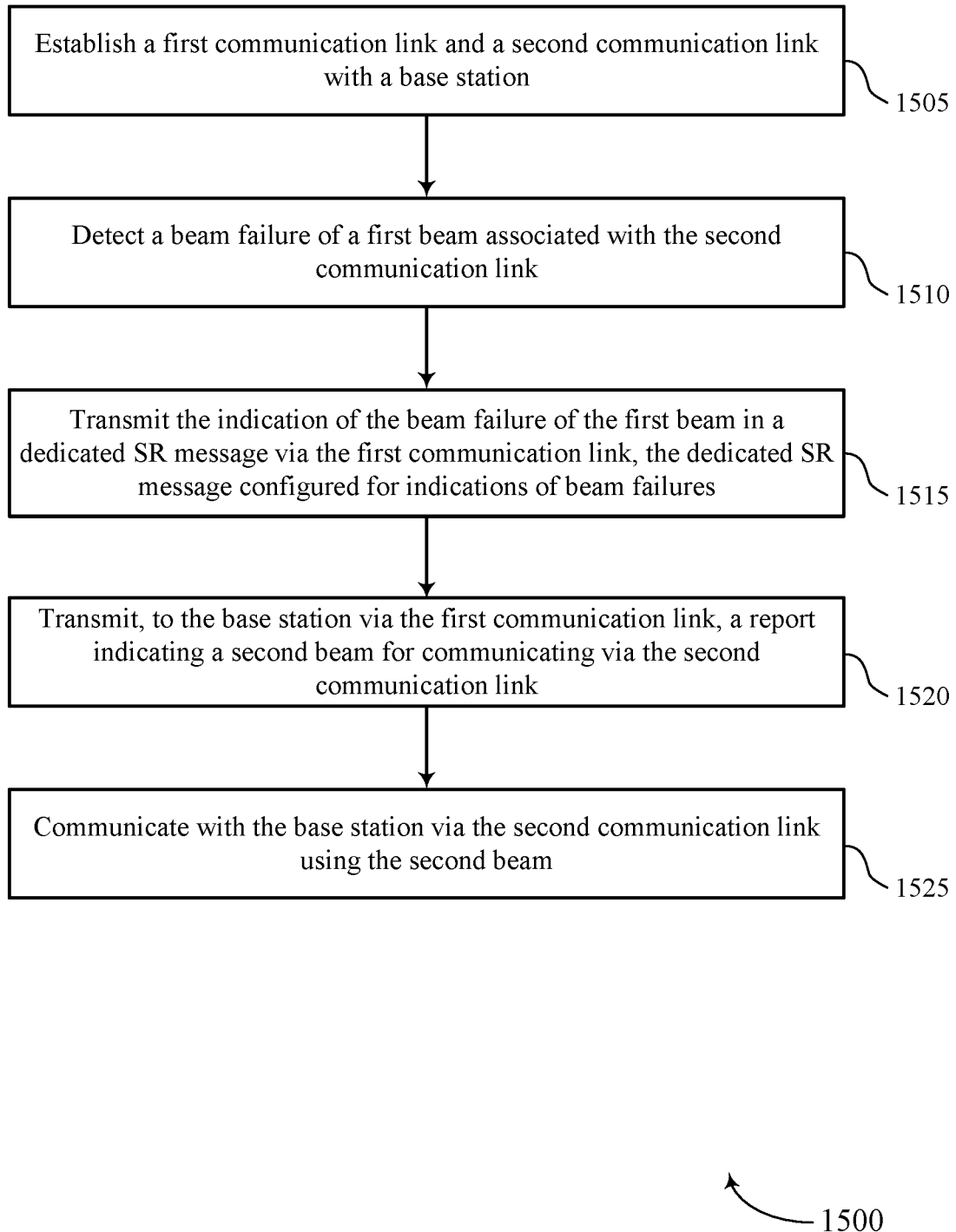

FIG. 15 shows a flowchart illustrating a method 1500 that supports aspects of the present disclosure. The operations of method 1500 may be implemented by a UE or its components as described herein. For example, the operations of method 1500 may be performed by a UE communications manager as described with reference to FIGS. 6 through 9. In some examples, a UE may execute a set of instructions to control the functional elements of the UE to perform the functions described herein. Additionally or alternatively, a UE may perform aspects of the functions described herein using special-purpose hardware.

At 1505, the UE may establish a first communication link and a second communication link with a base station. The operations of 1505 may be performed according to the methods described herein. In some examples, aspects of the operations of 1505 may be performed by an establishment component as described with reference to FIGS. 6 through 9.

At 1510, the UE may detect a beam failure of a first beam associated with the second communication link. The operations of 1510 may be performed according to the methods described herein. In some examples, aspects of the operations of 1510 may be performed by a beam failure manager as described with reference to FIGS. 6 through 9.

At 1515, the UE may transmit the indication of the beam failure of the first beam in a dedicated SR message via the first communication link, the dedicated SR message configured for indications of beam failures. The operations of 1515 may be performed according to the methods described herein. In some examples, aspects of the operations of 1515 may be performed by an indication transmitter as described with reference to FIGS. 6 through 9.

At 1520, the UE may transmit, to the base station via the first communication link, a report indicating a second beam for communicating via the second communication link. The operations of 1520 may be performed according to the methods described herein. In some examples, aspects of the operations of 1520 may be performed by a report transmitter as described with reference to FIGS. 6 through 9.

At 1525, the UE may communicate with the base station via the second communication link using the second beam. The operations of 1525 may be performed according to the methods described herein. In some examples, aspects of the operations of 1525 may be performed by a communicator as described with reference to FIGS. 6 through 9.

Figure 16:
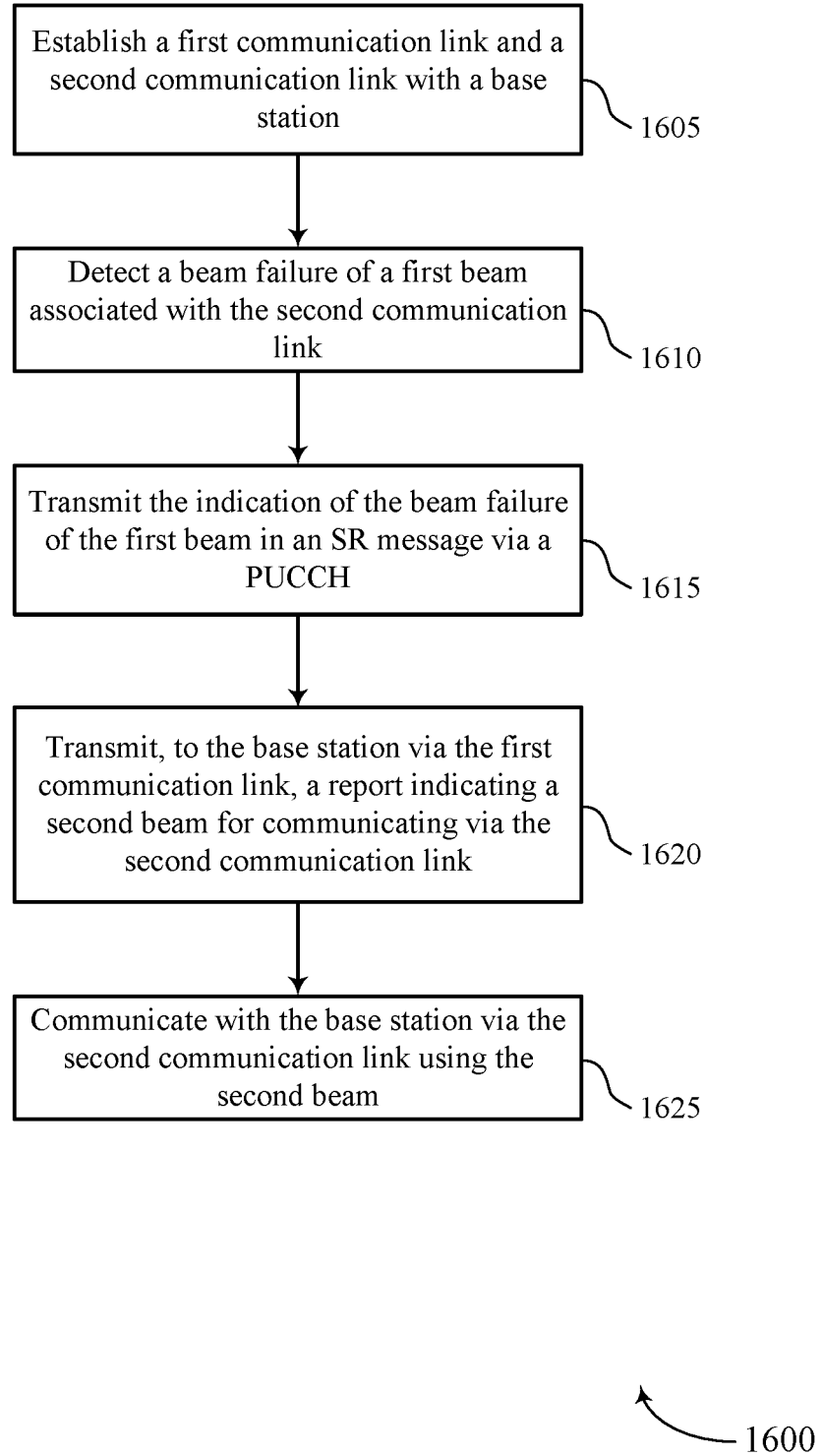

FIG. 16 shows a flowchart illustrating a method 1600 that supports aspects of the present disclosure. The operations of method 1600 may be implemented by a UE or its components as described herein. For example, the operations of method 1600 may be performed by a UE communications manager as described with reference to FIGS. 6 through 9. In some examples, a UE may execute a set of instructions to control the functional elements of the UE to perform the functions described herein. Additionally or alternatively, a UE may perform aspects of the functions described herein using special-purpose hardware.

At 1605, the UE may establish a first communication link and a second communication link with a base station. The operations of 1605 may be performed according to the methods described herein. In some examples, aspects of the operations of 1605 may be performed by an establishment component as described with reference to FIGS. 6 through 9.

At 1610, the UE may detect a beam failure of a first beam associated with the second communication link. The operations of 1610 may be performed according to the methods described herein. In some examples, aspects of the operations of 1610 may be performed by a beam failure manager as described with reference to FIGS. 6 through 9.

At 1615, the UE may transmit the indication of the beam failure of the first beam in an SR message via a PUCCH. The operations of 1615 may be performed according to the methods described herein. In some examples, aspects of the operations of 1615 may be performed by an indication transmitter as described with reference to FIGS. 6 through 9.

At 1620, the UE may transmit, to the base station via the first communication link, a report indicating a second beam for communicating via the second communication link. The operations of 1620 may be performed according to the methods described herein. In some examples, aspects of the operations of 1620 may be performed by a report transmitter as described with reference to FIGS. 6 through 9.

At 1625, the UE may communicate with the base station via the second communication link using the second beam. The operations of 1625 may be performed according to the methods described herein. In some examples, aspects of the operations of 1625 may be performed by a communicator as described with reference to FIGS. 6 through 9.

Figure 17:
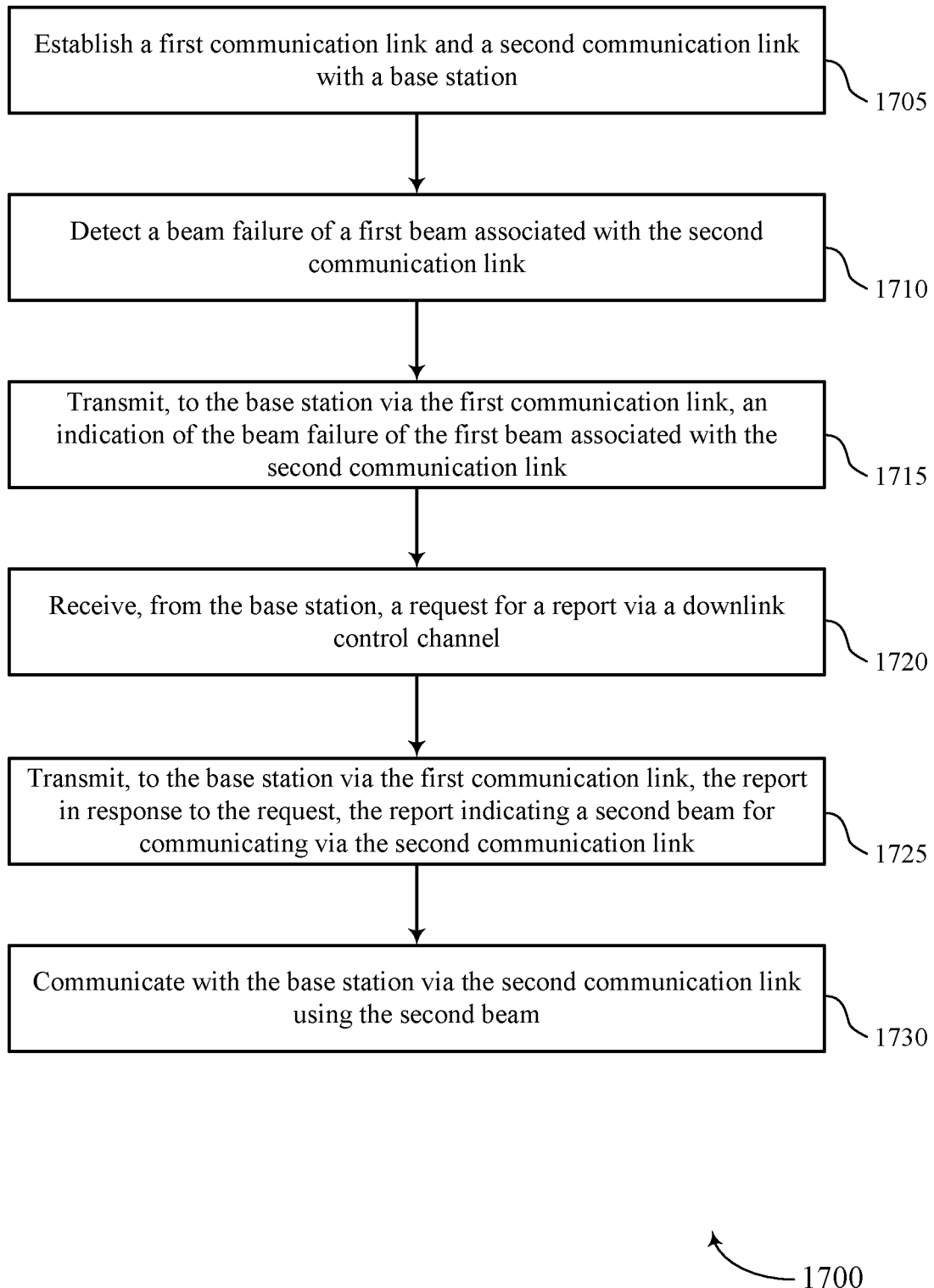

FIG. 17 shows a flowchart illustrating a method 1700 that supports aspects of the present disclosure. The operations of method 1700 may be implemented by a UE or its components as described herein. For example, the operations of method 1700 may be performed by a UE communications manager as described with reference to FIGS. 6 through 9. In some examples, a UE may execute a set of instructions to control the functional elements of the UE to perform the functions described herein. Additionally or alternatively, a UE may perform aspects of the functions described herein using special-purpose hardware.

At 1705, the UE may establish a first communication link and a second communication link with a base station. The operations of 1705 may be performed according to the methods described herein. In some examples, aspects of the operations of 1705 may be performed by an establishment component as described with reference to FIGS. 6 through 9.

At 1710, the UE may detect a beam failure of a first beam associated with the second communication link. The operations of 1710 may be performed according to the methods described herein. In some examples, aspects of the operations of 1710 may be performed by a beam failure manager as described with reference to FIGS. 6 through 9.

At 1715, the UE may transmit, to the base station via the first communication link, an indication of the beam failure of the first beam associated with the second communication link. The operations of 1715 may be performed according to the methods described herein. In some examples, aspects of the operations of 1715 may be performed by an indication transmitter as described with reference to FIGS. 6 through 9.

At 1720, the UE may receive, from the base station, a request for a report via a downlink control channel. The operations of 1720 may be performed according to the methods described herein. In some examples, aspects of the operations of 1720 may be performed by a request receiver as described with reference to FIGS. 6 through 9.

At 1725, the UE may transmit, to the base station via the first communication link, the report in response to the request, the report indicating a second beam for communicating via the second communication link. The operations of 1725 may be performed according to the methods described herein. In some examples, aspects of the operations of 1725 may be performed by a report transmitter as described with reference to FIGS. 6 through 9.

At 1730, the UE may communicate with the base station via the second communication link using the second beam. The operations of 1730 may be performed according to the methods described herein. In some examples, aspects of the operations of 1730 may be performed by a communicator as described with reference to FIGS. 6 through 9.

Figure 18:
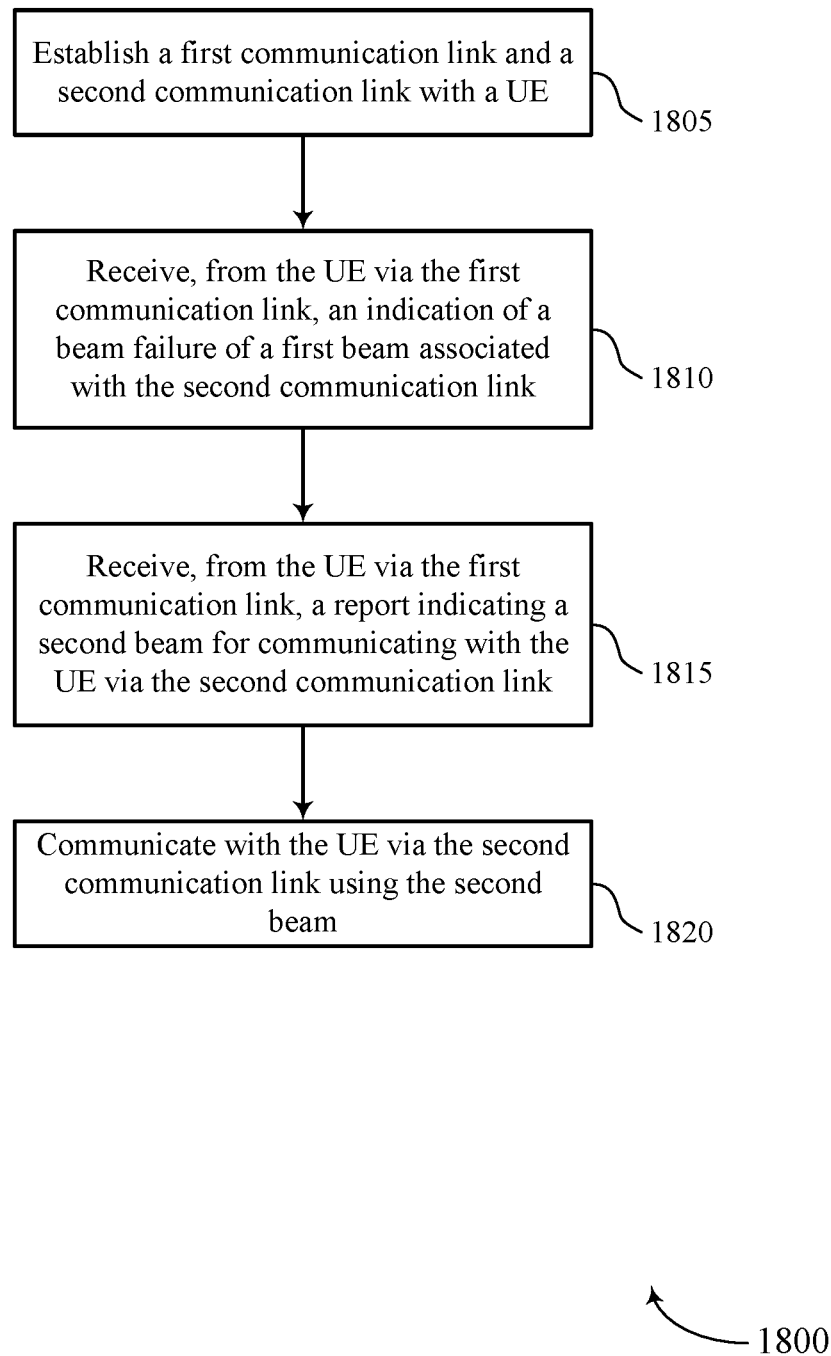

FIG. 18 shows a flowchart illustrating a method 1800 that supports aspects of the present disclosure. The operations of method 1800 may be implemented by a base station or its components as described herein. For example, the operations of method 1800 may be performed by a base station communications manager as described with reference to FIGS. 10 through 13. In some examples, a base station may execute a set of instructions to control the functional elements of the base station to perform the functions described herein. Additionally or alternatively, a base station may perform aspects of the functions described herein using special-purpose hardware.

At 1805, the base station may establish a first communication link and a second communication link with a UE. The operations of 1805 may be performed according to the methods described herein. In some examples, aspects of the operations of 1805 may be performed by a link manager as described with reference to FIGS. 10 through 13.

At 1810, the base station may receive, from the UE via the first communication link, an indication of a beam failure of a first beam associated with the second communication link. The operations of 1810 may be performed according to the methods described herein. In some examples, aspects of the operations of 1810 may be performed by an indication receiver as described with reference to FIGS. 10 through 13.

At 1815, the base station may receive, from the UE via the first communication link, a report indicating a second beam for communicating with the UE via the second communication link. The operations of 1815 may be performed according to the methods described herein. In some examples, aspects of the operations of 1815 may be performed by a report receiver as described with reference to FIGS. 10 through 13.

At 1820, the base station may communicate with the UE via the second communication link using the second beam. The operations of 1820 may be performed according to the methods described herein. In some examples, aspects of the operations of 1820 may be performed by a communication component as described with reference to FIGS. 10 through 13.

Figure 19:
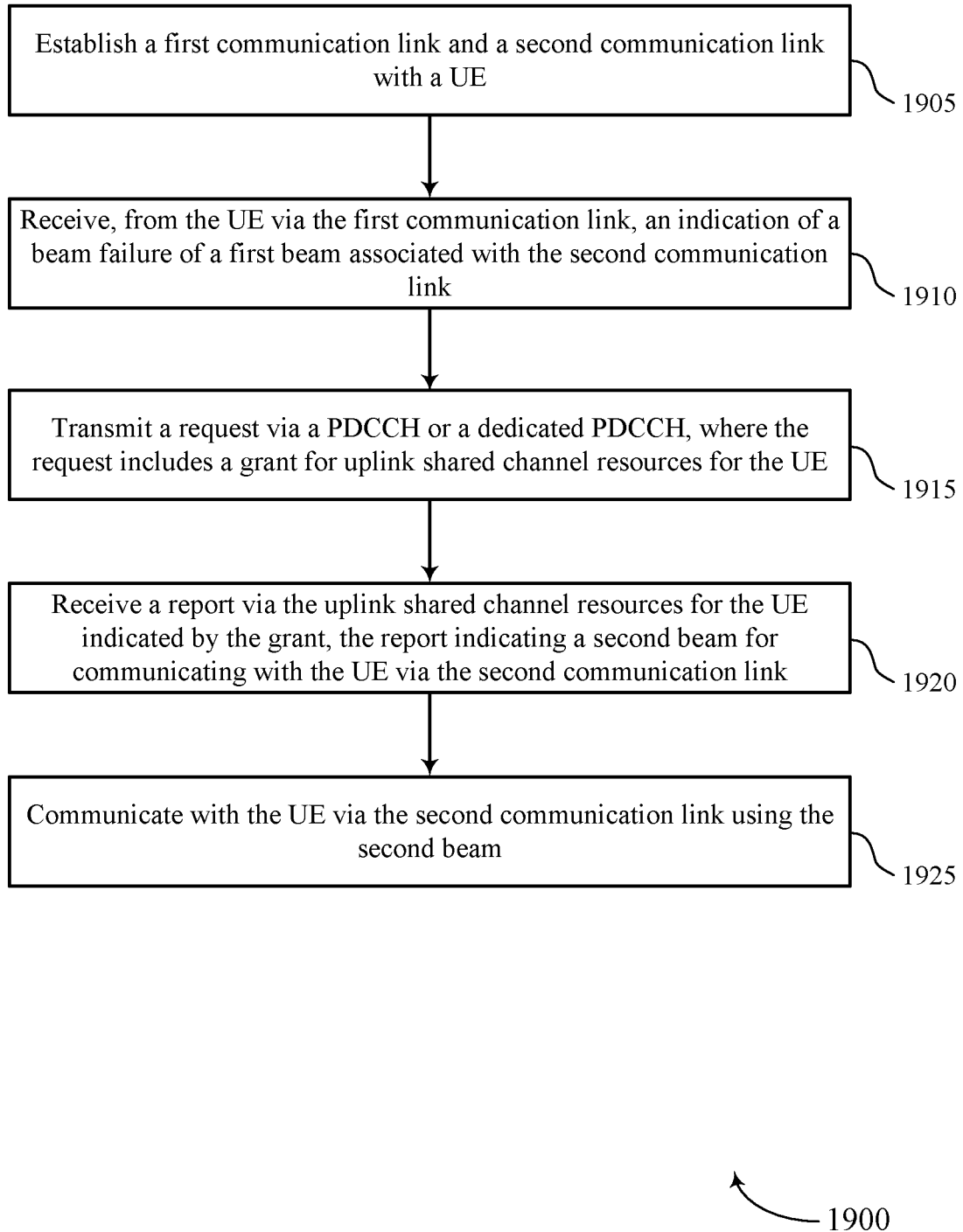

FIG. 19 shows a flowchart illustrating a method 1900 that supports aspects of the present disclosure. The operations of method 1900 may be implemented by a base station or its components as described herein. For example, the operations of method 1900 may be performed by a base station communications manager as described with reference to FIGS. 10 through 13. In some examples, a base station may execute a set of instructions to control the functional elements of the base station to perform the functions described herein. Additionally or alternatively, a base station may perform aspects of the functions described herein using special-purpose hardware.

At 1905, the base station may establish a first communication link and a second communication link with a UE. The operations of 1905 may be performed according to the methods described herein. In some examples, aspects of the operations of 1905 may be performed by a link manager as described with reference to FIGS. 10 through 13.

At 1910, the base station may receive, from the UE via the first communication link, an indication of a beam failure of a first beam associated with the second communication link. The operations of 1910 may be performed according to the methods described herein. In some examples, aspects of the operations of 1910 may be performed by an indication receiver as described with reference to FIGS. 10 through 13.

At 1915, the base station may transmit, to the UE, a request via a PDCCH or a dedicated PDCCH, where the request includes a grant for uplink shared channel resources for the UE. The operations of 1915 may be performed according to the methods described herein. In some examples, aspects of the operations of 1915 may be performed by a request transmitter as described with reference to FIGS. 10 through 13.

At 1920, the base station may receive a report via the uplink shared channel resources for the UE indicated by the grant, the report indicating a second beam for communicating with the UE via the second communication link. The operations of 1920 may be performed according to the methods described herein. In some examples, aspects of the operations of 1920 may be performed by a report receiver as described with reference to FIGS. 10 through 13.

At 1925, the base station may communicate with the UE via the second communication link using the second beam. The operations of 1925 may be performed according to the methods described herein. In some examples, aspects of the operations of 1925 may be performed by a communication component as described with reference to FIGS. 10 through 13.

Figure 20:
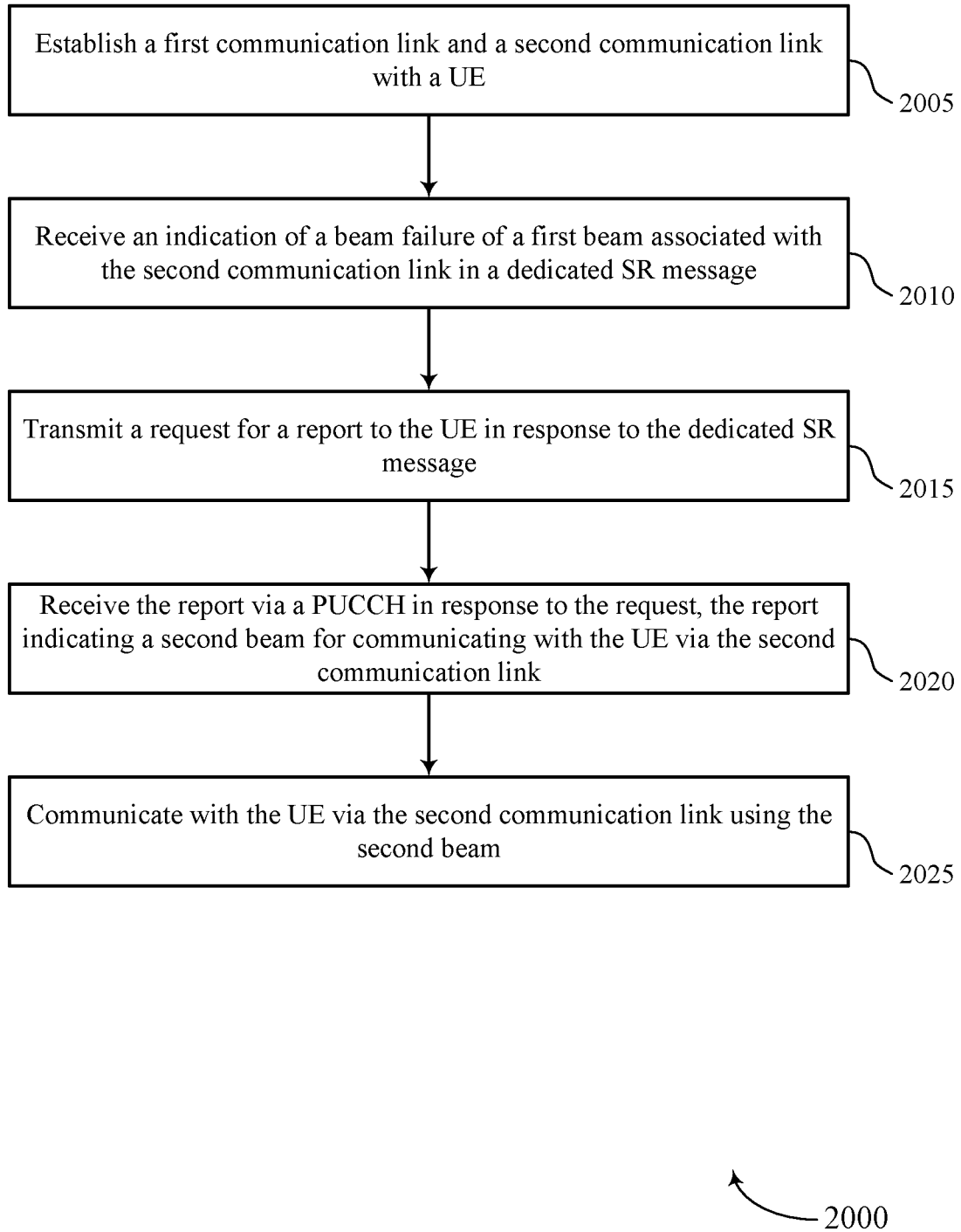

FIG. 20 shows a flowchart illustrating a method 2000 that supports aspects of the present disclosure. The operations of method 2000 may be implemented by a base station or its components as described herein. For example, the operations of method 2000 may be performed by a base station communications manager as described with reference to FIGS. 10 through 13. In some examples, a base station may execute a set of instructions to control the functional elements of the base station to perform the functions described herein. Additionally or alternatively, a base station may perform aspects of the functions described herein using special-purpose hardware.

At 2005, the base station may establish a first communication link and a second communication link with a UE. The operations of 2005 may be performed according to the methods described herein. In some examples, aspects of the operations of 2005 may be performed by a link manager as described with reference to FIGS. 10 through 13.

At 2010, the base station may receive an indication of a beam failure of a first beam associated with the second communication link in a dedicated SR message. The operations of 2010 may be performed according to the methods described herein. In some examples, aspects of the operations of 2010 may be performed by an indication receiver as described with reference to FIGS. 10 through 13.

At 2015, the base station may transmit a request for a report to the UE in response to the dedicated SR message. The operations of 2015 may be performed according to the methods described herein. In some examples, aspects of the operations of 2015 may be performed by a request transmitter as described with reference to FIGS. 10 through 13.

At 2020, the base station may receive the report via a PUCCH in response to the request, the report indicating a second beam for communicating with the UE via the second communication link. The operations of 2020 may be performed according to the methods described herein. In some examples, aspects of the operations of 2020 may be performed by a report receiver as described with reference to FIGS. 10 through 13.

At 2025, the base station may communicate with the UE via the second communication link using the second beam. The operations of 2025 may be performed according to the methods described herein. In some examples, aspects of the operations of 2025 may be performed by a communication component as described with reference to FIGS. 10 through 13.

It should be noted that the methods described herein describe possible implementations, and that the operations and the steps may be rearranged or otherwise modified and that other implementations are possible. Further, aspects from two or more of the methods may be combined.

Techniques described herein may be used for various wireless communications systems such as code division multiple access (CDMA), time division multiple access (TDMA), frequency division multiple access (FDMA), orthogonal frequency division multiple access (OFDMA), single carrier frequency division multiple access (SC-FDMA), and other systems. A CDMA system may implement a radio technology such as CDMA2000, Universal Terrestrial Radio Access (UTRA), etc. CDMA2000 covers IS-2000, IS-95, and IS-856 standards. IS-2000 Releases may be commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM).

An OFDMA system may implement a radio technology such as Ultra Mobile Broadband (UMB), E-UTRA, Institute of Electrical and Electronics Engineers (IEEE) 802.11 (Wi-Fi), IEEE 802.16 (WiMAX), IEEE 802.20, Flash-OFDM, etc. UTRA and E-UTRA are part of Universal Mobile Telecommunications System (UMTS). LTE, LTE-A, and LTE-A Pro are releases of UMTS that use E-UTRA. UTRA, E-UTRA, UMTS, LTE, LTE-A, LTE-A Pro, NR, and GSM are described in documents from the organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned herein as well as other systems and radio technologies. While aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR applications.

A macro cell generally covers a relatively large geographic area (e.g., several kilometers in radius) and may allow unrestricted access by UEs with service subscriptions with the network provider. A small cell may be associated with a lower-powered base station, as compared with a macro cell, and a small cell may operate in the same or different (e.g., licensed, unlicensed) frequency bands as macro cells. Small cells may include pico cells, femto cells, and micro cells according to various examples. A pico cell, for example, may cover a small geographic area and may allow unrestricted access by UEs with service subscriptions with the network provider. A femto cell may also cover a small geographic area (e.g., a home) and may provide restricted access by UEs having an association with the femto cell (e.g., UEs in a closed subscriber group (CSG), UEs for users in the home, and the like). An eNB/gNB for a macro cell may be referred to as a macro eNB/gNB. An eNB/gNB for a small cell may be referred to as a small cell eNB/gNB, a pico eNB/gNB, a femto eNB/gNB, or a home eNB/gNB. An eNB/gNB may support one or multiple (e.g., two, three, four, and the like) cells, and may also support communications using one or multiple component carriers.

The wireless communications systems described herein may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. The techniques described herein may be used for either synchronous or asynchronous operations.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA, or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein can be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the herein are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communications at a user equipment (UE), comprising:
   establishing a first communication link and a second communication link with a base station;
   detecting a beam failure of a first beam associated with the second communication link;
   transmitting, to the base station via the first communication link, an indication of the beam failure of the first beam associated with the second communication link;
   transmitting, to the base station via the first communication link, a report indicating a second beam for communicating via the second communication link; and
   communicating with the base station via the second communication link using the second beam.

2. The method of claim 1, further comprising:
   transmitting the indication of the beam failure of the first beam in a dedicated scheduling request (SR) message via the first communication link, the dedicated SR message configured for indications of beam failures; and transmitting the report via a physical uplink control channel (PUCCH) after transmission of the indication of the beam failure.

3. The method of claim 1, further comprising:
receiving, from the base station, a request for the report via a downlink control channel; and
transmitting the report in response to the request.

4. The method of claim 3, further comprising:
receiving the request via a physical downlink control channel (PDCCH) or a dedicated PDCCH, wherein the request comprises a grant for uplink shared channel resources for the UE; and
transmitting the report via the uplink shared channel resources for the UE indicated by the grant.

5. The method of claim 3, further comprising:
receiving the request within a time window after transmission of the indication of the beam failure.

6. The method of claim 3, wherein the request is associated with a downlink control information (DCI) format for the downlink control channel.

7. The method of claim 1, further comprising:
transmitting the indication of the beam failure of the first beam via a physical uplink control channel (PUCCH);
receiving a request for the report from the base station in response to the indication; and
transmitting the report via the PUCCH in response to the request.

8. The method of claim 7, further comprising:
transmitting the indication of the beam failure of the first beam in a scheduling request (SR) message via the PUCCH;
receiving a grant for uplink shared channel resources from the base station in response to the SR message; and
transmitting the report using the uplink shared channel resources indicated by the grant.

9. The method of claim 7, further comprising:
monitoring for a response from the base station based at least in part on the SR message; and
transmitting one or more additional SR messages based at least in part on an absence of a response to the SR message from the base station, the one or more additional SR messages transmitted according to an SR count limit or a time duration associated with SR messages.

10. The method of claim 7, further comprising:
transmitting the report via the PUCCH after transmission of the indication of the beam failure.

11. The method of claim 1, further comprising:
transmitting the report after expiration of a time duration following transmission of the indication of the beam failure, the time duration associated with a number of symbols or a fixed time interval.

12. The method of claim 11, wherein the report is transmitted in an absence of receiving a request for the report.

13. The method of claim 1, further comprising:
monitoring a downlink reference signal from the base station via the second communication link using the first beam; and
measuring a parameter of the downlink reference signal based at least in part on the monitoring, wherein the beam failure of the first beam is detected based at least in part on determining that the measured parameter crosses a threshold.

14. The method of claim 1, further comprising:
monitoring a downlink reference signal from the base station via the second communication link using the second beam of a set of beams; and
determining that the second beam is preferred over the first beam for communicating via the second communication link based at least in part on the monitoring.

15. The method of claim 1, further comprising:
updating a receive beam for a downlink transmission beam for the second communication link according to the second beam; and
updating an uplink beam for an uplink transmission for the second communication link for the UE after expiration of a time interval following the update of the downlink transmission beam.

16. A method for wireless communications at a base station, comprising:
establishing a first communication link and a second communication link with a user equipment (UE);
receiving, from the UE via the first communication link, an indication of a beam failure of a first beam associated with the second communication link;
receiving, from the UE via the first communication link, a report indicating a second beam for communicating with the UE via the second communication link; and
communicating with the UE via the second communication link using the second beam.

17. The method of claim 16, further comprising:
receiving the indication of the beam failure of the first beam in a dedicated scheduling request (SR) message via the first communication link, the dedicated SR message configured for indications of beam failures.

18. The method of claim 17, further comprising:
receiving the report via a physical uplink control channel (PUCCH) after transmission of the indication of the beam failure.

19. The method of claim 16, further comprising:
receiving the indication of the beam failure of the first beam in a scheduling request (SR) message via a physical uplink control channel (PUCCH).

20. The method of claim 19, further comprising:
transmitting a grant for uplink shared channel resources to the UE in response to the SR message; and
receiving the report via the uplink shared channel resources indicated by the grant.

21. The method of claim 19, further comprising:
receiving the report via the PUCCH after transmission of the indication of the beam failure.

22. The method of claim 16, further comprising:
receiving the report after expiration of a time duration following receipt of the indication of the beam failure, the time duration associated with a number of symbols or a fixed time interval.

23. The method of claim 16, further comprising:
transmitting, to the UE, a request for the report via a downlink control channel, wherein the report is received in response to the request.

24. The method of claim 23, further comprising:
transmitting the request via a physical downlink control channel (PDCCH) or a dedicated PDCCH, wherein the request comprises a grant for uplink shared channel resources for the UE; and
receiving the report via the uplink shared channel resources for the UE indicated by the grant.

25. The method of claim 23, further comprising:
receiving the indication of the beam failure of the first beam in a dedicated scheduling request (SR) message;

transmitting the request for the report to the UE in response to the dedicated SR message; and receiving the report via a physical uplink control channel (PUCCH) in response to the request.

26. The method of claim 23, further comprising:

transmitting the request within a time window after receipt of the indication of the beam failure.

27. The method of claim 23, wherein the request is associated with a downlink control information (DCI) format for the downlink control channel.

28. The method of claim 16, further comprising:

modifying a transmission configuration for a downlink beam for the second communication link according to the second beam, wherein the modified transmission configuration comprises an autonomously activated transmission configuration indicator (TCI) state.

29. An apparatus for wireless communications at a user equipment (UE), comprising:

a processor;

memory coupled with the processor; and instructions stored in the memory and executable by the processor to cause the apparatus to:

establish a first communication link and a second communication link with a base station;

detect a beam failure of a first beam associated with the second communication link;

transmit, to the base station via the first communication link, an indication of the beam failure of the first beam associated with the second communication link;

transmit, to the base station via the first communication link, a report indicating a second beam for communicating via the second communication link; and communicate with the base station via the second communication link using the second beam.

30. An apparatus for wireless communications at a base station, comprising:

a processor;

memory coupled with the processor; and instructions stored in the memory and executable by the processor to cause the apparatus to:

establish a first communication link and a second communication link with a user equipment (UE);

receive, from the UE via the first communication link, an indication of a beam failure of a first beam associated with the second communication link;

receive, from the UE via the first communication link, a report indicating a second beam for communicating with the UE via the second communication link; and communicate with the UE via the second communication link using the second beam.

* * * * *